(12) United States Patent
Yuki et al.

(10) Patent No.: US 10,718,930 B2
(45) Date of Patent: Jul. 21, 2020

(54) FIXED FOCAL LENGTH LENS AND IMAGE PICKUP APPARATUS

(71) Applicant: CANON KABUSHIKI KAISHA, Tokyo (JP)

(72) Inventors: Akihiko Yuki, Utsunomiya (JP); Shohei Kikuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 16/142,510

(22) Filed: Sep. 26, 2018

(65) Prior Publication Data
US 2019/0101727 A1 Apr. 4, 2019

(30) Foreign Application Priority Data
Sep. 29, 2017 (JP) .................. 2017-189812

(51) Int. Cl.
| | | |
|---|---|---|
| *G02B 13/18* | (2006.01) | |
| *G02B 13/00* | (2006.01) | |
| *G02B 9/12* | (2006.01) | |
| *G02B 7/04* | (2006.01) | |
| *G02B 9/64* | (2006.01) | |
| *G02B 13/16* | (2006.01) | |
| *G02B 5/00* | (2006.01) | |
| *G02B 15/177* | (2006.01) | |

(52) U.S. Cl.
CPC ........... *G02B 13/0035* (2013.01); *G02B 7/04* (2013.01); *G02B 9/12* (2013.01); *G02B 9/64* (2013.01); *G02B 13/16* (2013.01); *G02B 5/005* (2013.01); *G02B 13/0045* (2013.01); *G02B 13/18* (2013.01); *G02B 15/177* (2013.01)

(58) Field of Classification Search
CPC ........ G02B 13/0045; G02B 9/64; G02B 7/04; G02B 13/18; G02B 5/005; G02B 9/12; G02B 13/16; G02B 15/177
USPC ................................. 359/708, 716, 740, 784
See application file for complete search history.

(56) References Cited

U.S. PATENT DOCUMENTS

| | | | |
|---|---|---|---|
| 8,861,085 B2 * | 10/2014 | Nakahara ............... | G02B 13/18 359/554 |
| 9,069,156 B2 | 6/2015 | Ito et al. | |
| 9,310,589 B2 | 4/2016 | Wakazono et al. | |
| 9,470,878 B2 | 10/2016 | Yuki | |
| 9,678,317 B2 | 6/2017 | Kikuchi | |
| 9,904,044 B2 | 2/2018 | Kikuchi et al. | |

(Continued)

FOREIGN PATENT DOCUMENTS

| | | |
|---|---|---|
| JP | 2014048488 A | 3/2014 |
| JP | 2017015941 A | 1/2017 |

*Primary Examiner* — Evelyn A Lester
(74) *Attorney, Agent, or Firm* — Carter, DeLuca & Farrell LLP

(57) ABSTRACT

A fixed focal length lens including, in order from an object side to an image side, a first lens unit having a positive refractive power, a second lens unit and a third lens unit, wherein the first lens unit does not move for focusing, at least the second lens unit moves for focusing, a distance between each pair of adjacent lens units changes for focusing, and the first lens unit includes two negative lenses disposed in succession from the object side, and wherein a focal length of the fixed focal length lens, a focal length of the first lens unit, and a combined focal length of the two negative lenses of the first lens unit are appropriately set.

10 Claims, 15 Drawing Sheets

(56) References Cited

U.S. PATENT DOCUMENTS 10,073,255 B2 * 9/2018 Morooka ............ A61B 1/00039
2014/0029119 A1 * 1/2014 Chou .................... G02B 13/18
359/717

* cited by examiner

FIXED FOCAL LENGTH LENS AND IMAGE PICKUP APPARATUS

BACKGROUND OF THE INVENTION

Field of the Invention

The present invention relates to a fixed focal length lens and an image pickup apparatus.

Description of the Related Art

Among image pickup optical systems used in photographic cameras and movie cameras, there is a demand for an image pickup optical system that has a wide angle and a low F-number and which also has a substantially uniform resolving power from the center of the image plane to the periphery of the image plane over the entire object distance. In order to realize such an image pickup optical system, a floating focus-type lens system has been proposed in which focusing is performed by moving two or more lens units along loci that are different from each other. For example, Japanese Patent Application Laid-Open No. 2014-48488 and Japanese Patent Application Laid-Open No. 2017-15941 disclose optical systems which each have a wide angle and a low F-number in which a first lens unit that does not move for focusing is disposed closest to the object side, and two lens units disposed further on the image side relative to the first lens unit are used as focusing units that move for focusing, with the two lens units being moved when focusing in a manner such that a distance between the two lens units changes.

However, in the optical system disclosed in Japanese Patent Application Laid-Open No. 2014-48488, because a positive refractive power of the first lens unit is insufficient, the diameter of the focusing units positioned on the image side relative to the first lens unit increases in size, and there are the problems that the weight of the focusing units is heavy and the load on the driving system is large.

Further, in the optical system disclosed in Japanese Patent Application Laid-Open No. 2017-15941, because the combined refractive power of two negative lenses on the object side in the first lens unit is insufficient, the diameter of a lens closest to the object side in the first lens unit is large that causes the problem that the diameter of the lens barrel is liable to be large.

SUMMARY OF THE INVENTION

The present invention provides, for example, a fixed focal length lens advantageous in wide angle, small F-number, small size and weight, and high optical performance thereof.

A fixed focal length lens of the present invention include, in order from an object side to an image side, a first lens unit having a positive refractive power, a second lens unit and a third lens unit, wherein the first lens unit does not move for focusing, at least the second lens unit moves for focusing, a distance between each pair of adjacent lens units changes for focusing, and the first lens unit includes two negative lenses disposed in succession from the object side, and wherein conditional expressions:

$$1.0 < f1/f < 6.5, \text{ and}$$

$$0.05 < |f1n|/f1 < 0.22$$

are satisfied where f represents a focal length of the fixed focal length lens, f1 represents a focal length of the first lens unit, and f1n represents a combined focal length of the two negative lenses of the first lens unit.

Further features of the present invention will become apparent from the following description of exemplary embodiments with reference to the attached drawings.

DESCRIPTION OF THE EMBODIMENTS

Figure 1:
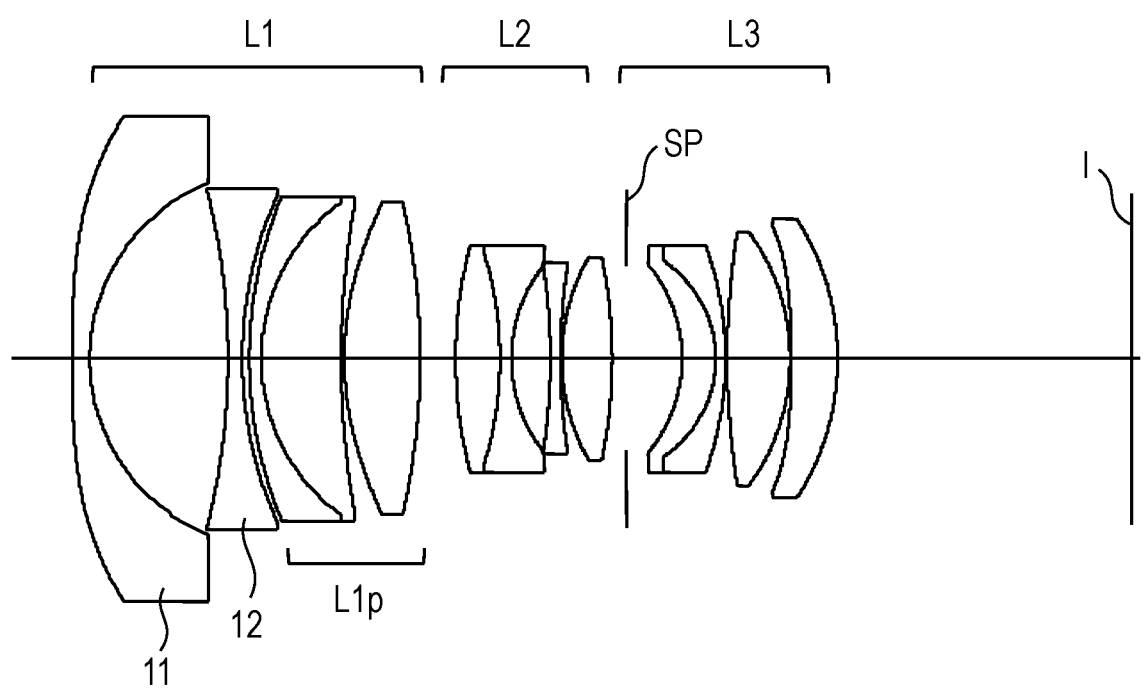
FIG. 1 is a cross-sectional view of lenses when focused at infinity in Numerical Embodiment 1.

Preferred embodiments of the present invention will now be described in detail in accordance with the accompanying drawings.

First, features of the fixed focal length lens of the present invention will be described in parallel with respective conditional expressions.

To achieve a reduction in the size and weight of a floating focus-type lens that has a wide angle of view and a large aperture, a feature of the present invention is that the present invention defines a ratio between the focal length of a first lens unit and a focal length of the entire system, and a ratio between a combined or composite focal length of two negative lenses disposed on the object side inside the first lens unit and the focal length of the first lens unit.

Specifically, a fixed focal length lens and an image pickup apparatus having the fixed focal length lens of the present invention includes, in order from an object side to an image side, a positive first lens unit, second lens unit and third lens unit, in which the first lens unit does not move for focusing and at least the second lens unit moves for focusing, distances between lens units that are adjacent to each other each change for focusing, and the first lens unit includes two negative lenses disposed in succession from the object side, wherein, when a focal length of the entire system is represented by "f", a focal length of the first lens unit is represented by "f1", and a combined focal length of the two negative lenses of the first lens unit is represented by "f1n", the following conditional expressions are satisfied:

$$1.0 < f1/f < 6.5 \quad (1)$$

$$0.05 < |f1n|/f1 < 0.22 \quad (2).$$

Optical actions obtained by adopting a configuration including a positive first lens unit that does not move for focusing, and a second lens unit and a third lens unit that move for focusing, and having two negative lenses on the object side in the first lens unit according to the present invention will now be described.

By configuring a first lens unit L1 as a lens unit having a positive refractive power, axial rays which the first lens unit L1 emits are formed into convergent light, and it is possible to enlarge the aperture of the lenses while suppressing an increase in the size of a second lens unit L2 and a third lens unit L3.

Further, by the first lens unit L1 having a configuration that includes, in order from the object side to the image side, a negative first lens and a negative second lens, widening of the angles of the lenses is enabled while suppressing an increase in the diameter of the lens that is closest to the object side of the first lens unit L1.

In addition, by satisfying the aforementioned expressions (1) and (2), it is possible to effectively achieve a reduction in the size and weight of a floating focus-type lens that has a wide angle of view and a large aperture.

Expression (1) defines a ratio between the focal length of the first lens unit L1 and the focal length f of the entire system. By satisfying expression (1), a reduction in the size of the diameter of a lens unit that is on the image side relative to the first lens unit as well as high optical performance can be efficiently achieved. If the upper limit of expression (1) cannot be satisfied, the positive refractive power of the first lens unit L1 will be weak, and consequently an action that converges axial rays using the first lens unit L1 will weaken and the diameter of a lens unit that is on the image side relative to the first lens unit L1 will increase in size. If the lower limit of expression (1) cannot be satisfied, the positive refractive power of the first lens unit L1 will be too strong, and consequently it will be difficult to favorably correct spherical aberration over the entire object distance.

More preferably, expression (1) may be set as follows:

$$2.0 < f1/f < 6.2 \quad (1a).$$

Expression (2) defines a ratio between the combined focal length of the two negative lenses disposed on the object side inside the first lens unit and the focal length of the first lens unit. By satisfying expression (2), a reduction in the size of the diameter of the lens closest to the object side of the first lens unit L1 as well as high optical performance can be efficiently achieved. If the upper limit of expression (2) cannot be satisfied, an action that refracts off-axial rays using the two negative lenses disposed on the object side in the first lens unit is weak, and the diameter of the lens closest to the object side of the first lens unit L1 increases in size. If the lower limit of expression (2) is not satisfied, the refractive power of the two negative lenses disposed on the object side in the first lens unit is too strong, and consequently it will be difficult to favorably correct curvature of field over the entire object distance.

More preferably, expression (2) may be set as follows:

$$0.10 < |f1n|/f1 < 0.21 \quad (2a).$$

As a more preferable aspect of the fixed focal length lens of the present invention, a focal length f11 of the negative first lens disposed on the object side among the two negative lenses disposed on the object side, and a focal length f1 of the first lens unit satisfy the following conditional expression:

$$0.3 < |f11|/f1 < 1.0 \quad (3).$$

If the upper limit of expression (3) is not satisfied, an action that refracts off-axial rays using the negative first lens is weak, and the diameter of the lens closest to the object side of the first lens unit L1 increases in size. If the lower limit of expression (3) is not satisfied, the refractive power of the negative first lens is too strong, and consequently it becomes difficult to favorably correct distortion over the entire object distance. More preferably, expression (3) is set as follows:

$$0.35 < |f11|/f1 < 0.8 \tag{3a}$$

As a more preferable aspect of the fixed focal length lens of the present invention, the fixed focal length lens has the following characteristic. A focal length f12 of the negative second lens disposed on the image side among the two negative lenses disposed on the object side in the first lens unit, and the focal length f1 of the first lens unit satisfy the following conditional expression:

$$0.1 < |f12|/f1 < 0.7 \tag{4}$$

If the upper limit of expression (4) s not satisfied, an action that refracts off-axial rays using the negative second lens is weak, and the diameter of the lens closest to the object side of the first lens unit L1 increases in size. If the lower limit of expression (4) is not satisfied, the refractive power of the negative second lens is too strong, and consequently it becomes difficult to favorably correct curvature of field over the entire object distance. More preferably, expression (4) is set as follows:

$$0.2 < |f12|/f1 < 0.5 \tag{4a}$$

As a more preferable aspect of the fixed focal length lens of the present invention, among the two negative lenses disposed on the object side in the first lens unit, a radius of curvature R11i of an image-side surface of the negative first lens disposed on the object side and a radius of curvature R12o of an object-side surface of the negative second lens disposed on the image side satisfy the following conditional expression:

$$-1.5 < (R11i+R12o)/(R11i-R12o) < 0 \tag{5}$$

If the upper limit of expression (5) is not satisfied, an action that refracts off-axial rays in an air gap formed between the negative first lens and the negative second lens is weak, and the diameter of the lens closest to the object side of the first lens unit L1 increases in size. If the lower limit of expression (5) is not satisfied, an action that refracts off-axial rays in an air gap formed between the negative first lens and the negative second lens is too strong, and consequently it becomes difficult to favorably correct curvature of field and distortion over the entire object distance. More preferably, expression (5) is set as follows:

$$-1.1 < (R11i+R12o)/(R11i-R12o) < -0.2 \tag{5a}$$

As a more preferable aspect of the fixed focal length lens of the present invention, among the two negative lenses disposed on the object side in the first lens unit, an Abbe number v11 of the negative first lens disposed on the object side satisfies the following conditional expression:

$$50 < v11 < 80 \tag{6}$$

If the upper limit of expression (6) is not satisfied, when using the currently existing materials, the refractive index of the material used for the negative first lens is too small, and when the refractive power of the negative first lens is strengthened, it becomes difficult to favorably correct curvature of field and distortion over the entire object distance. If the lower limit of expression (6) is not satisfied, the dispersion of the material used for the negative first lens will be too small, and when the refractive power of the negative first lens is strengthened, it becomes difficult to favorably correct chromatic aberration of magnification over the entire object distance. More preferably, expression (6) is set as follows:

$$53 < v11 < 75 \tag{6a}$$

As a more preferable aspect of the fixed focal length lens of the present invention, among the two negative lenses disposed on the object side in the first lens unit, a refractive index represented by "N12" of the negative second lens disposed on the image side satisfies the following conditional expression:

$$1.70 < N12 < 2.10 \tag{7}$$

If the upper limit of expression (7) is not satisfied, the refractive index of the material used for the negative second lens is too large and the Petzval sum of the entire lens system becomes too large in the positive direction, and it becomes difficult to favorably correct curvature of field over the entire object distance. If the lower limit expression (7) is not satisfied, when the refractive power of the negative second lens is strengthened, it becomes difficult to favorably correct distortion over the entire object distance. More preferably, expression (7) is set as follows:

$$1.75 < N12 < 2.05 \tag{7a}$$

As a more preferable aspect of the fixed focal length lens of the present invention, the first lens unit has a sub lens unit L1p disposed on the image side relative to the two negative lenses disposed on the object side, and a focal length represented by "f1p" of the sub lens unit L1p and a combined focal length f1n of the two negative lenses satisfy the following conditional expression:

$$1.0 < f1p/|f1n| < 3.0 \tag{8}$$

If the upper limit of expression (8) is not satisfied, the positive refractive power of the sub lens unit L1p of the first lens unit is weak, and consequently an action that converges axial rays weakens and the diameter of a lens unit on the image side relative to the first lens unit L1 increases in size. If the lower limit of expression (8) is not satisfied, the positive refractive power of the sub lens unit L1p of the first lens unit is too strong, and consequently it becomes difficult to favorably correct spherical aberration over the entire object distance. More preferably, expression (8) is set as follows:

$$1.4 < f1p/|f1n| < 1.8 \tag{8a}$$

As a more preferable aspect of the fixed focal length lens of the present invention, the first lens unit has a sub lens unit L1p disposed on the image side relative to the two negative lenses disposed on the object side, the sub lens unit L1p includes at least one positive lens, and an average refractive index N1pave of the positive lenses included in the sub lens unit L1p satisfies the following conditional expression:

$$1.6 < N1pave < 2.0 \tag{9}$$

If the upper limit of expression (9) is not satisfied, when the positive refractive power of the sub lens unit L1p of the first lens unit is strengthened, it becomes difficult to favorably correct spherical aberration over the entire object distance. If the lower limit of expression (9) is not satisfied, when using the currently existing materials, the dispersion of the material of the positive lenses included in the sub lens unit L1p is too small and it becomes difficult to favorably correct axial chromatic aberration over the entire object distance. More preferably, expression (9) is set as follows:

$$1.65 < N1pave < 1.98 \tag{9a}$$

As a more preferable aspect of the fixed focal length lens of the present invention, the fixed focal length lens may have the following characteristic. The third lens unit moves independently from the second lens unit at a time of focusing, and when shifting focus to a closest object from an object at infinity, a movement amount represented by "m2" of the second lens unit and a movement amount represented by "m3" of the third lens unit satisfy the following conditional expression:

$$0.4 < |m2|/|m3| < 2.0 \quad (10).$$

If the upper limit of expression (10) is not satisfied, the movement amount m2 of the second lens unit is too large and it is necessary to secure a distance between the first lens unit and the second lens unit, and it becomes therefore difficult to reduce the overall length of the lens. If the lower limit of expression (10) is not satisfied, the movement amount m2 of the second lens unit is too small and it becomes difficult to favorably correct axial chromatic aberration and curvature of field over the entire object distance. More preferably, expression (10) may be set as follows:

$$0.5 < |m2|/|m3| < 1.90 \quad (10a).$$

In addition, an image pickup apparatus of the present invention includes a fixed focal length lens of the respective embodiments, and a solid-state image pickup element having a predetermined effective image pickup range that receives an optical image formed by the fixed focal length lens. Hereunder, specific configurations of the fixed focal length lens of the present invention are described by way of the features of lens configurations of Numerical Embodiments 1 to 5 that correspond to Embodiments 1 to 5.

Embodiment 1

Figure 2A:
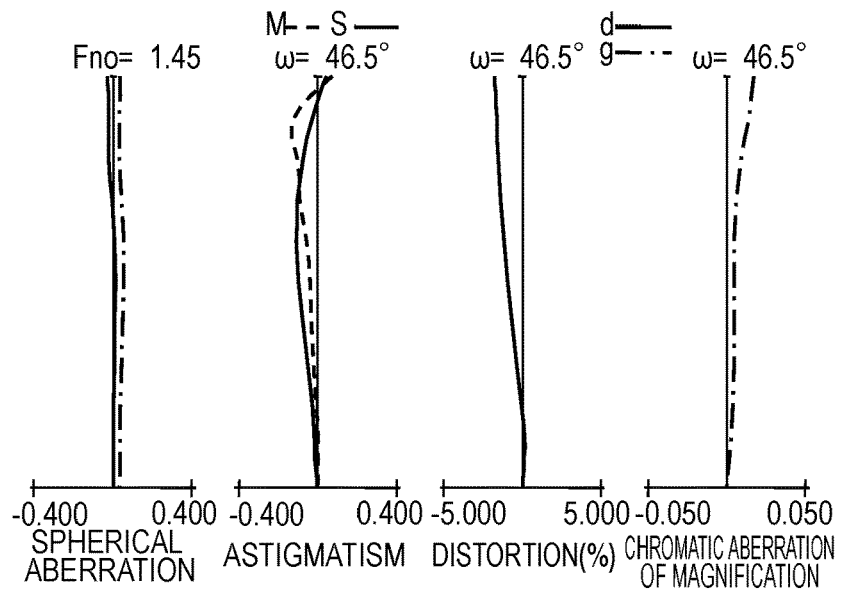
FIG. 2A illustrates longitudinal aberration graphs when focused on an object at an object distance of infinity in Numerical Embodiment 1.
Figure 2B:
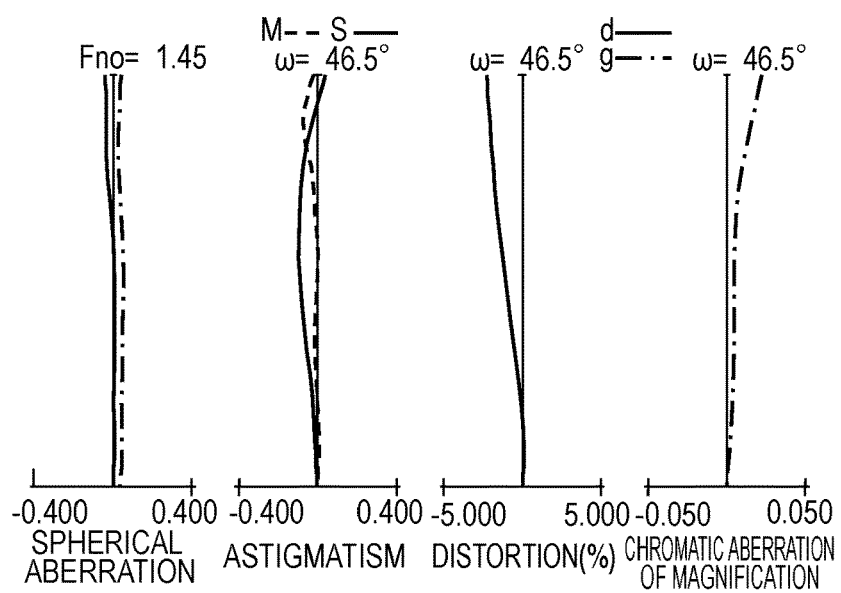
FIG. 2B illustrates longitudinal aberration graphs when focused on an object at an object distance of 1.0 m in Numerical Embodiment 1.
Figure 2C:
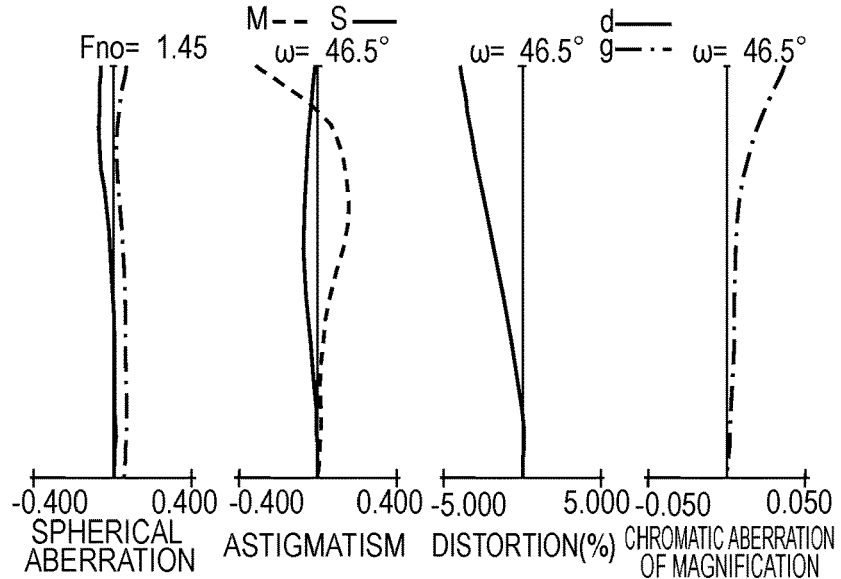
FIG. 2C illustrates longitudinal aberration graphs when focused on an object at an object distance of 0.3 m in Numerical Embodiment 1.

FIG. 1 is a cross-sectional view of lenses when focused at infinity in a fixed focal length lens that is Embodiment 1 (Numerical Embodiment 1) of the present invention. FIGS. 2A, 2B and 2C illustrate longitudinal aberration graphs when focused on an object at an object distance of infinity, 1.0 m and 0.3 m, respectively. The values of the focal lengths are values when a numerical embodiment that is described later is expressed in mm units. The same also applies with respect to the numerical embodiments described hereunder.

In FIG. 1, the fixed focal length lens has, in order from an object side to an image side, a first lens unit L1 having a positive refractive power that does not move for focusing, and furthermore, a second lens unit L2 having a positive refractive power that moves to the object side when shifting focus to a nearby object from infinity, and a third lens unit L3 having a positive refractive power that, when shifting focus to a nearby object from infinity, moves to the object side by a movement amount that is different from a movement amount of the second lens unit L2. Reference characters SP denote an aperture stop. Reference character I denotes an image plane that, when using the fixed focal length lens as an image pickup optical system of a broadcast video camera, a video camera or a digital still camera, corresponds to an image pickup surface of a solid-state image pickup element (photoelectric conversion element) or the like that receives an optical image formed by the fixed focal length lens and performs photoelectric conversion thereof. When using the fixed focal length lens as an image pickup optical system of a film camera, the image plane I corresponds to a film surface that an image formed by the fixed focal length lens exposes to light.

In the longitudinal aberration graphs, a solid line and a broken line in the graphs illustrating spherical aberrations represent a d line and a g line, respectively. A broken line and a solid line in the graphs illustrating astigmatisms represent a meridional image plane and a sagittal image plane, respectively. A chain line in the graphs illustrating chromatic aberrations of magnification represents a g line. Further, ω represents a half angle of view, and Fno represents an F number. In the longitudinal aberration graphs, the spherical aberrations are shown in a scale of 0.4 mm, the astigmatisms are shown in a scale of 0.4 mm, the distortions are shown in a scale of 5%, and the chromatic aberrations of magnification are shown in a scale of 0.05 mm.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a meniscus convex lens that is convex toward the object side, and a biconvex lens. Further, a first surface is an aspherical surface, and mainly performs correction of distortion and astigmatism. In addition, an eighth surface is an aspherical surface, and mainly performs correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens and a biconvex lens. The third lens unit L3 corresponds to a seventeenth surface to a twenty-fourth surface. The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a meniscus convex lens which is concave toward the object side. Further, a twenty-third surface is an aspherical surface, and mainly performs correction of spherical aberration and astigmatism.

Numerical Embodiment 1 that corresponds to the above Embodiment 1 will now be described. In all of the numerical embodiments and not just Numerical Embodiment 1, reference character "i" represents the order of the surface (optical surface) as counted from the object side, reference characters "ri" represent the radius of curvature of the i-th surface as counted from the object side, and reference characters "di" represents the distance (on the optical axis) between the i-th surface and the i+1-th surface as counted from the object side. Further, reference characters "ndi" and "vdi" represent the refractive index, and Abbe number of a medium (optical member) between the i-th surface and the i+1-th surface, and reference characters "BF" represent an air-converted back focus. An aspherical surface shape is represented by the following formula when the optical axis direction is defined as an X axis, a direction perpendicular to the optical axis is defined as an H axis, a direction in which light travels is defined as positive, R represents the paraxial curvature radius, k represents the conic constant, and A4, A6, A8, A10, A12, A14, A16, A3, A5, A7, A9, A11, A13 and A15 are the aspherical surface coefficients. Further, "e-Z" means "×10⁻ᶻ".

$$X = \frac{H^2/R}{1+\sqrt{1-(1+k)(H/R)^2}} + A4H^4 + A6H^6 +$$
$$A8H^8 + A10H^{10} + A12H^{12} + A14H^{14} + A16H^{16} + A3H^3 +$$
$$A5H^5 + A7H^7 + A9H^9 + A11H^{11} + A13H^{13} + A15H^{15}$$

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 93.08° and an aperture of F1.45. Furthermore, the present embodiment realizes a fixed focal length lens having high optical performance in which aberrations are favorably corrected over the entire focusing range. Although it is essential that the fixed focal length lens of the present invention satisfies expressions (1) and (2), the fixed focal length lens need not satisfy expressions (3) to (10). However, a better effect can be achieved if the fixed focal length lens satisfies at least one of expressions (3) to (10). This similarly applies with respect to the other embodiments also.

Figure 15:
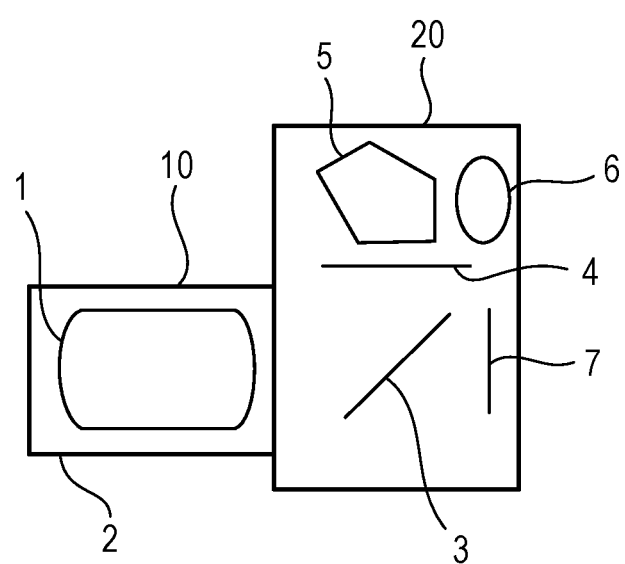
FIG. 15 is a schematic view of main portions of an image pickup apparatus of the present invention.

FIG. 15 is a schematic view of main portions of a digital still camera. In FIG. 15, an optical system 10 includes an image-taking optical system 1 of the present numerical embodiment. The image-taking optical system 1 is held in a lens barrel 2 that is a holding member. Reference numeral 20 denotes a camera body. The camera body 20 includes a quick return mirror 3, a focusing glass 4, a pentaprism 5, an eyepiece 6, and the like. The quick return mirror 3 reflects a light flux from the image-taking optical system 1 upward. The focusing glass 4 is disposed at an image formation position in the image-taking optical system 1. The pentaprism 5 converts an inverted image formed on the focusing glass 4 into an erected image. An observer observes the erected image through the eyepiece 6. Reference numeral 7 denotes a photosensitive surface on which a solid-state image pickup element (a photoelectric conversion element) such as a CCD sensor or a CMOS sensor, a silver halide film, or the like is disposed to receive the image. When taking an image, the quick return mirror 3 recedes from the optical path, and the image-taking optical system 1 forms the image on the photosensitive surface 7. Note that, the optical system of the present invention can be applied to a broadcast video camera, a movie camera, a video camera, a digital still camera and a silver halide photography camera and the like.

Thus, by applying the fixed focal length lens of the present invention to a single-lens reflex camera, a video camera or a cinema camera, an image pickup apparatus that has high optical performance is realized.

Embodiment 2

Figure 3:
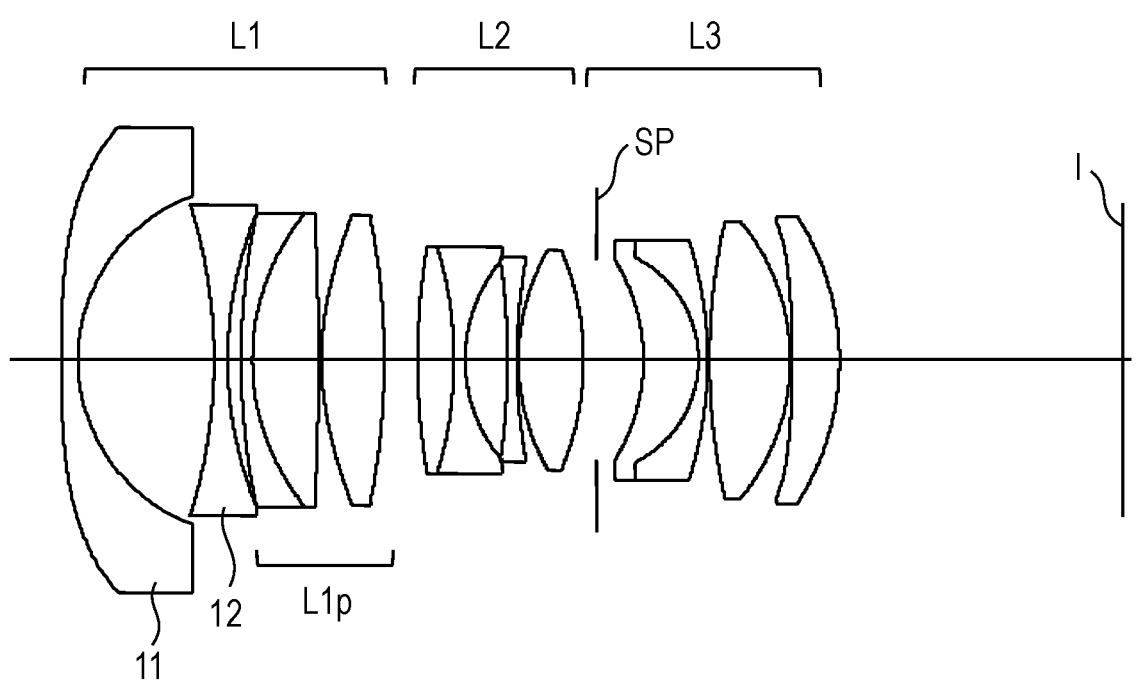
FIG. 3 is a cross-sectional view of lenses when focused at infinity in Numerical Embodiment 2.
Figure 4A:
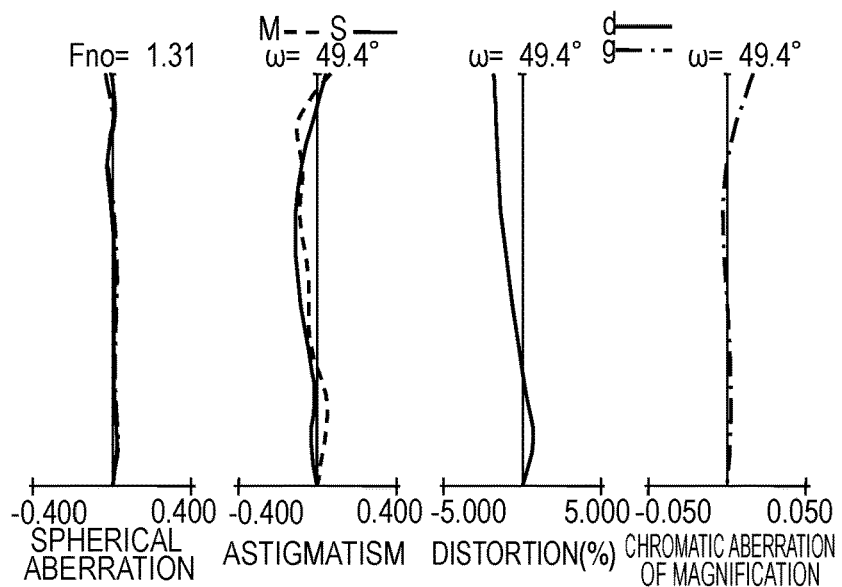
FIG. 4A illustrates longitudinal aberration graphs when focused on an object at an object distance of infinity in Numerical Embodiment 2.
Figure 4B:
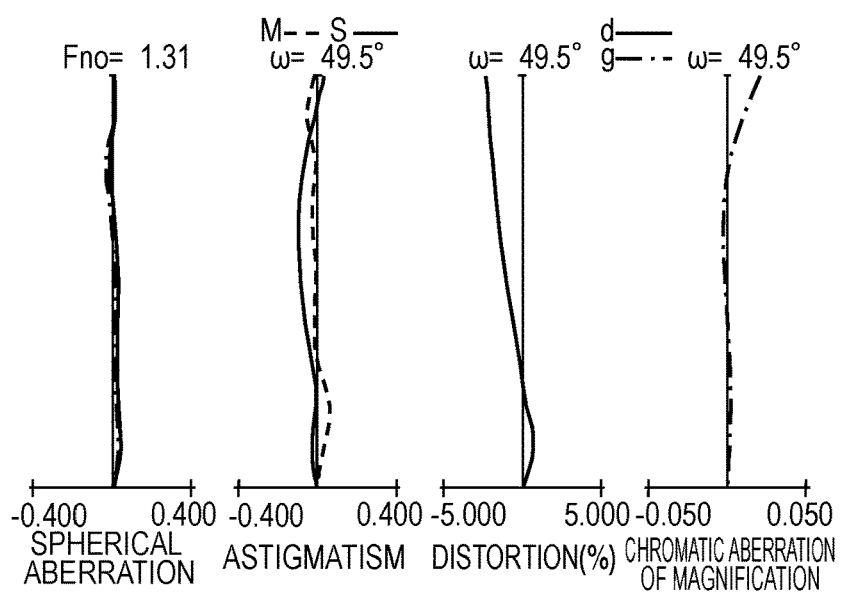
FIG. 4B illustrates longitudinal aberration graphs when focused on an object at an object distance of 0.9 m in Numerical Embodiment 2.
Figure 4C:
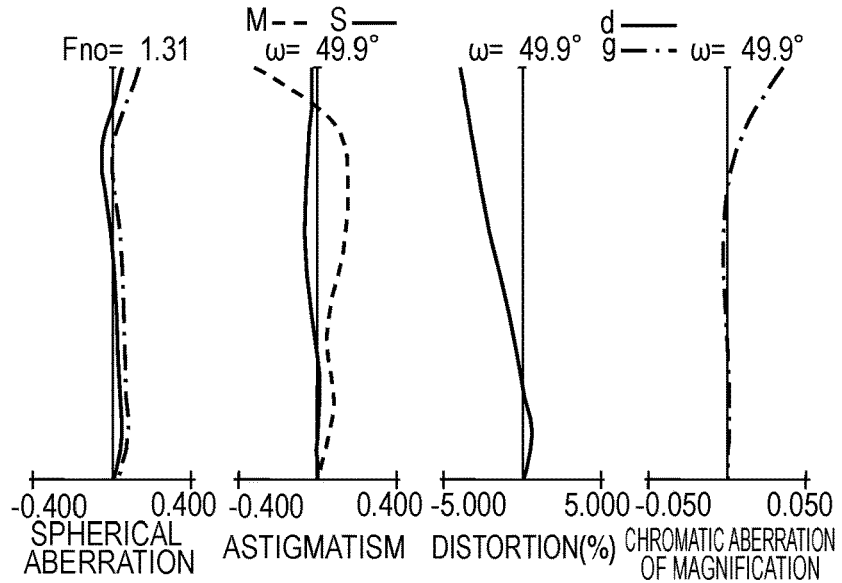
FIG. 4C illustrates longitudinal aberration graphs when focused on an object at an object distance of 0.3 m in Numerical Embodiment 2.

FIG. 3 is a cross-sectional view of lenses when focused at infinity in a fixed focal length lens that is Embodiment 2 (Numerical Embodiment 2) of the present invention. FIGS. 4A, 4B and 4C illustrate longitudinal aberration graphs when focused on an object at infinity, 0.9 m and 0.3 m, respectively.

In FIG. 3, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a biconvex lens, and a biconvex lens. Further, the first surface and the second surface are aspherical surfaces, and mainly perform correction of distortion and astigmatism. In addition, the eighth surface is an aspherical surface, and mainly performs correction of spherical aberration.

The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fourth surface.

The third lens unit L3 includes, in order from the object side to the image side, an aperture stop SP, a cemented lens consisting of a meniscus convex lens which is concave toward the object side and a meniscus concave lens which is concave toward the object side, a biconvex lens, and a meniscus convex lens which is concave toward the object side. Further, the twenty-third surface is an aspherical surface, and mainly performs correction of spherical aberration and astigmatism.

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 98.88° and an aperture of F1.31. Furthermore, the present embodiment realizes a fixed focal length lens having high optical performance in which aberrations are favorably corrected over the entire focusing range.

Embodiment 3

Figure 5:
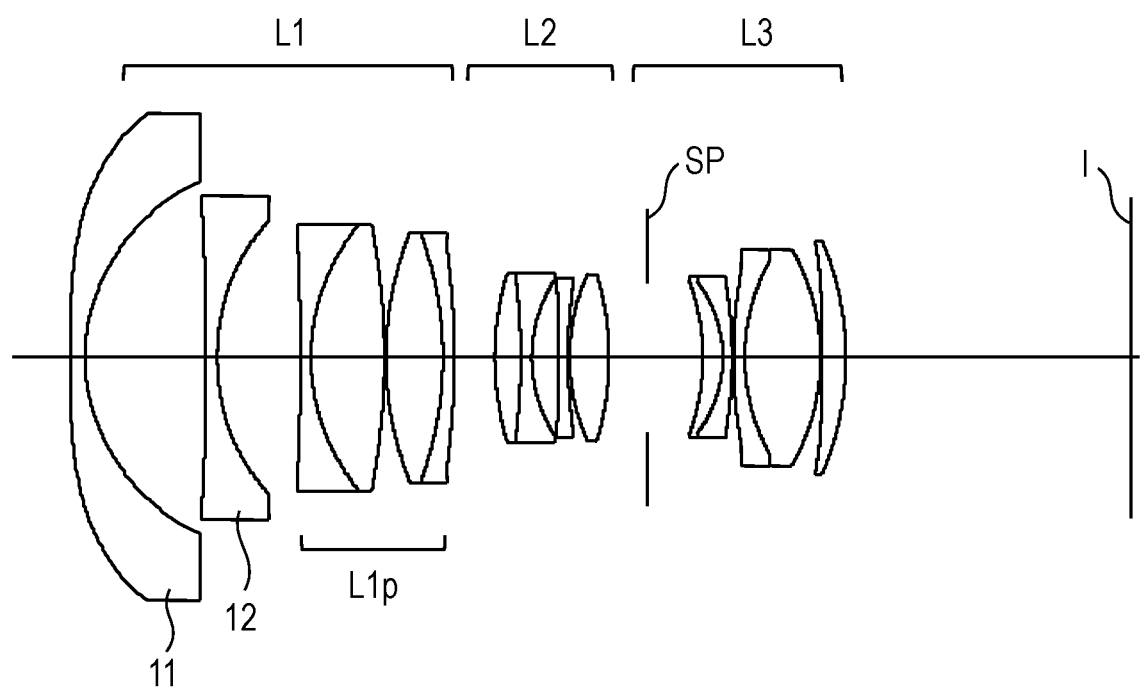
FIG. 5 is a cross-sectional view of lenses when focused at infinity in Numerical Embodiment 3.
Figure 6A:
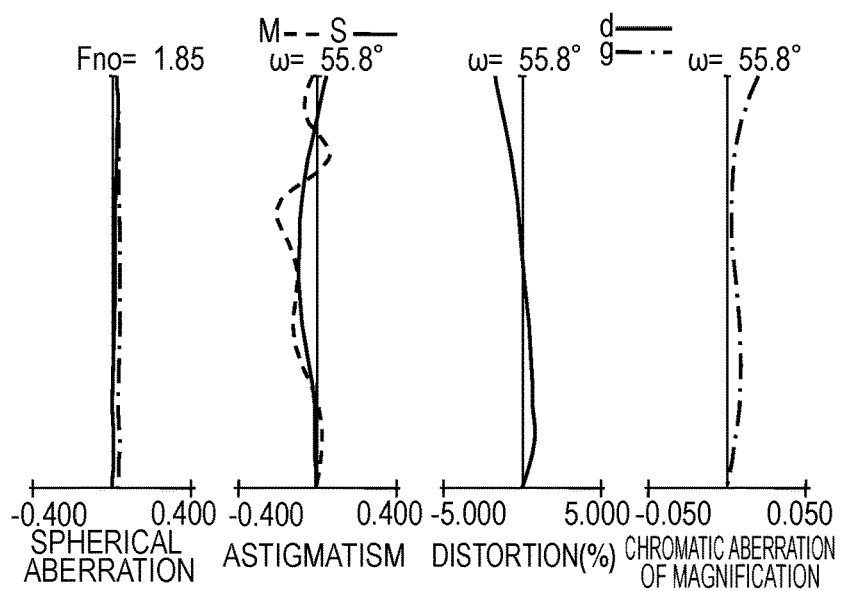
FIG. 6A illustrates longitudinal aberration graphs when focused on an object at an object distance of infinity in Numerical Embodiment 3.
Figure 6B:
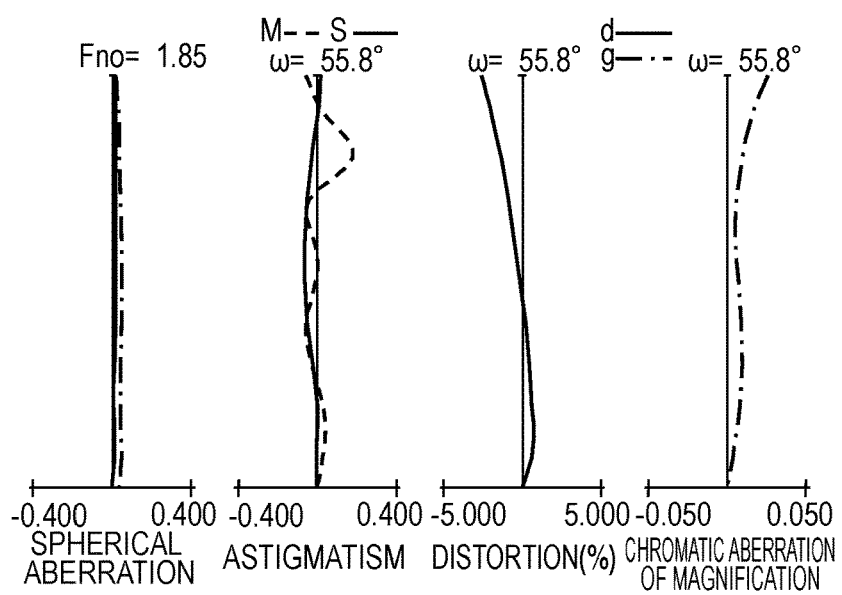
FIG. 6B illustrates longitudinal aberration graphs when focused on an object at an object distance of 0.7 m in Numerical Embodiment 3.
Figure 6C:
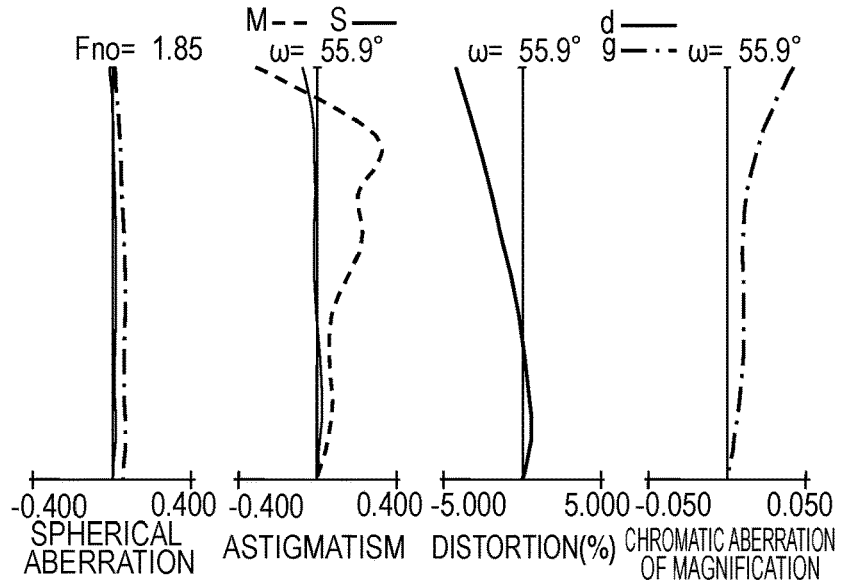
FIG. 6C illustrates longitudinal aberration graphs when focused on an object at an object distance of 0.3 m in Numerical Embodiment 3.

FIG. 5 is a cross-sectional view of lenses when focused at infinity in a fixed focal length lens that is Embodiment 3 (Numerical Embodiment 3) of the present invention. FIGS. 6A, 6B and 6C illustrate longitudinal aberration graphs when focused on an object at infinity, 0.7 m and 0.3 m, respectively.

In FIG. 5, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described.

The first lens unit L1 corresponds to a first surface to a tenth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a cemented lens consisting of a biconvex lens and a meniscus concave lens which is concave toward the object side. Further, the first surface and the second surface are aspherical surfaces, and mainly perform correction of distortion and astigmatism. The third surface and the fourth surface are aspherical surfaces, and mainly perform correction of astigmatism. In addition, the eighth surface is an aspherical surface, and mainly performs correction of spherical aberration.

The second lens unit L2 corresponds to an eleventh surface to a seventeenth surface. The second lens unit L2 includes, in order from the object side to the image side, a cemented lens consisting of a biconvex lens and a biconcave lens, a biconcave lens, and a biconvex lens.

The third lens unit L3 corresponds to an eighteenth surface to a twenty-sixth surface. The third lens unit L3 includes, in order from the object side to the image side, an aperture stop SP, a cemented lens consisting of a meniscus convex lens which is concave toward the object side and a meniscus concave lens which is concave toward the object side, a cemented lens consisting of a meniscus concave lens which is concave toward the image side and a biconvex lens, and a meniscus convex lens that is convex toward the image side. Further, the twenty-fifth surface is an aspherical surface, and mainly performs correction of spherical aberration and astigmatism.

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 111.64° and an aperture of F1.85. Furthermore, the present embodiment realizes a fixed focal length lens having high optical performance in which aberrations are favorably corrected over the entire focusing range.

Embodiment 4

Figure 7:
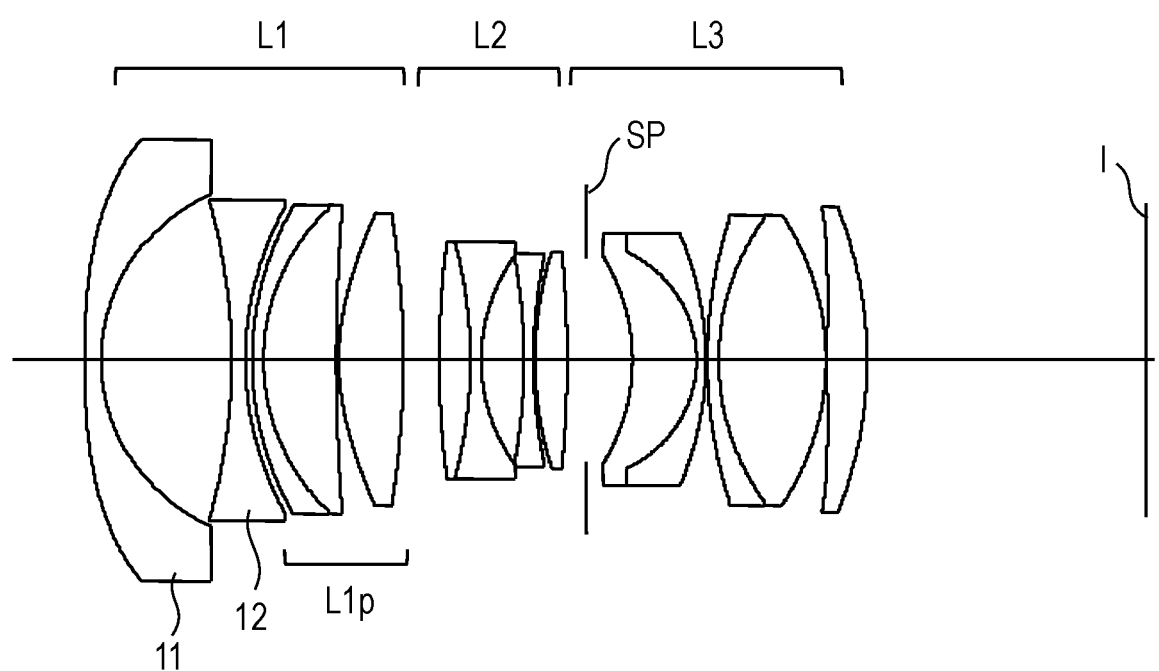
FIG. 7 is a cross-sectional view of lenses when focused at infinity in Numerical Embodiment 4.
Figure 8A:
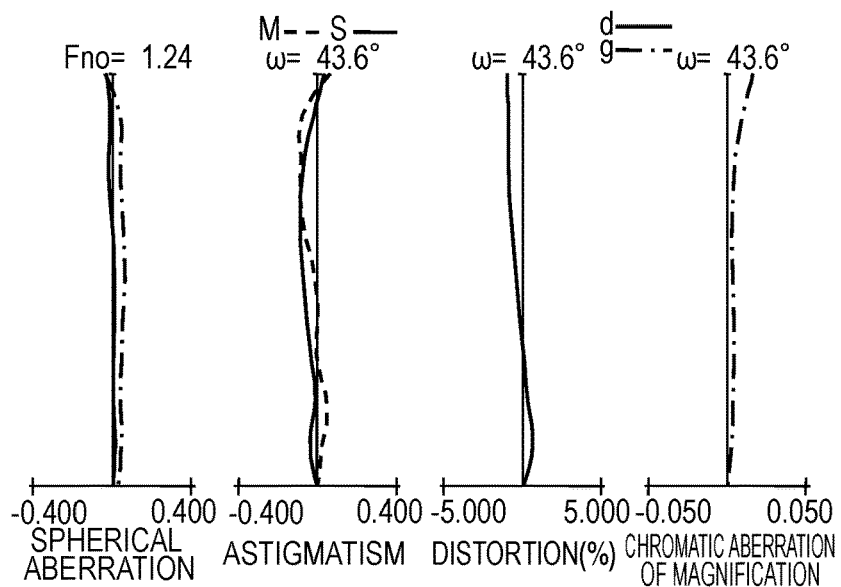
FIG. 8A illustrates longitudinal aberration graphs when focused on an object at an object distance of infinity in Numerical Embodiment 4.
Figure 8B:
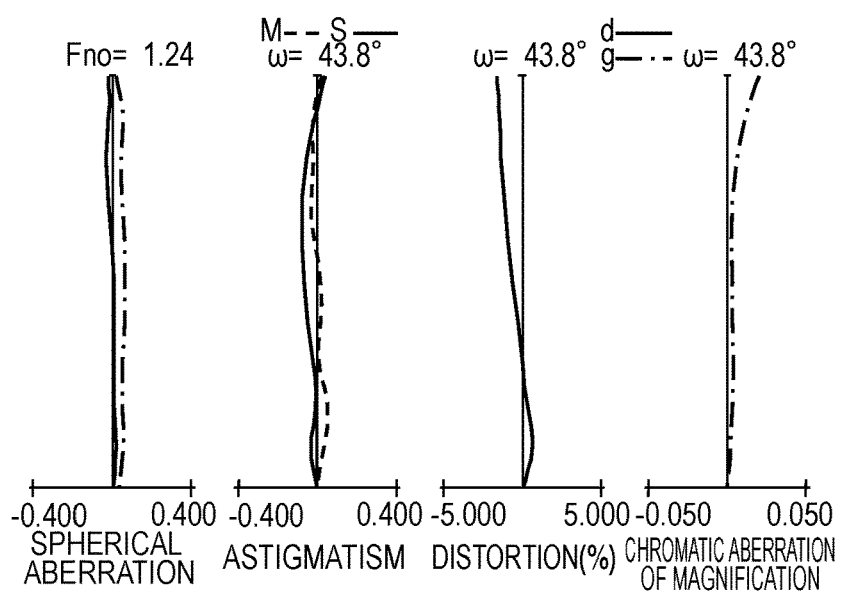
FIG. 8B illustrates longitudinal aberration graphs when focused on an object at an object distance of 1.1 m in Numerical Embodiment 4.
Figure 8C:
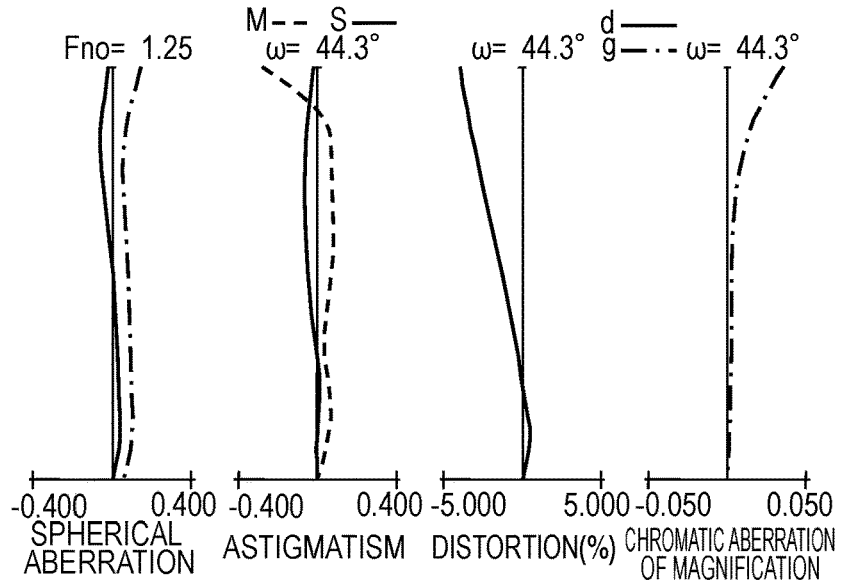
FIG. 8C illustrates longitudinal aberration graphs when focused on an object at an object distance of 0.3 m in Numerical Embodiment 4.

FIG. 7 is a cross-sectional view of lenses when focused at infinity in a fixed focal length lens that is Embodiment 4 (Numerical Embodiment 4) of the present invention. FIGS. 8A, 8B and 8C illustrate longitudinal aberration graphs when focused on an object at infinity, 1.1 m and 0.3 m, respectively.

In FIG. 7, the fixed focal length lens has, in order from an object side to an image side, a first lens unit L1 having a positive refractive power that does not move for focusing, and furthermore, a second lens unit L2 having a negative refractive power that, when focusing on a nearby object from infinity, moves to the object side, and a third lens unit L3 having a positive refractive power that, when focusing on a nearby object from infinity, moves to the object side by a movement amount that is different from a movement amount of the second lens unit L2.

Next, the first lens unit L1 in the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a meniscus convex lens that is convex toward the object side, and a biconvex lens. The first surface and the second surface are aspherical surfaces, and mainly perform correction of distortion and astigmatism. The third surface is an aspherical surface, and mainly performs correction of astigmatism. In addition, the eighth surface is an aspherical surface, and mainly performs correction of spherical aberration. The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fifth surface. The third lens unit L3 includes, in order from the object side to the image side, an aperture stop SP, a cemented lens consisting of a meniscus convex lens which is concave toward the object side and a meniscus concave lens which is concave toward the object side, a cemented lens consisting of a meniscus concave lens which is concave toward the image side and a biconvex lens, and a biconvex lens. Further, the twenty-fourth surface is an aspherical surface, and mainly performs correction of spherical aberration and astigmatism.

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 87.26° and an aperture of F1.24. Furthermore, the present embodiment realizes a fixed focal length lens having high optical performance in which aberrations are favorably corrected over the entire focusing range.

Embodiment 5

Figure 9:
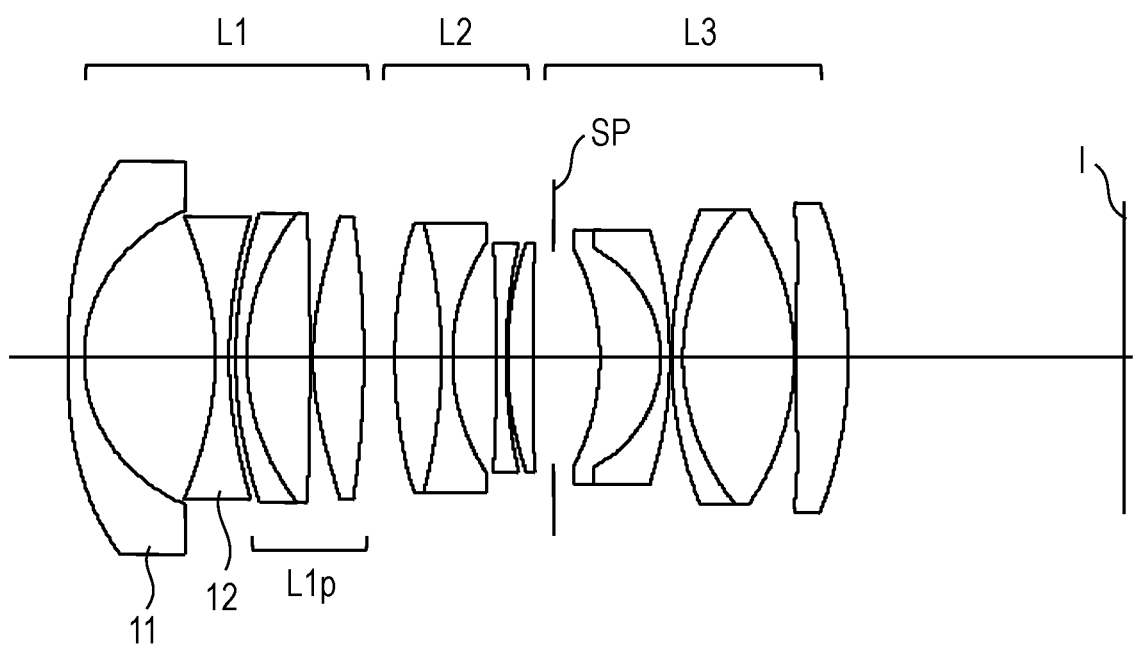
FIG. 9 is a cross-sectional view of lenses when focused at infinity in Numerical Embodiment 5.
Figure 10A:
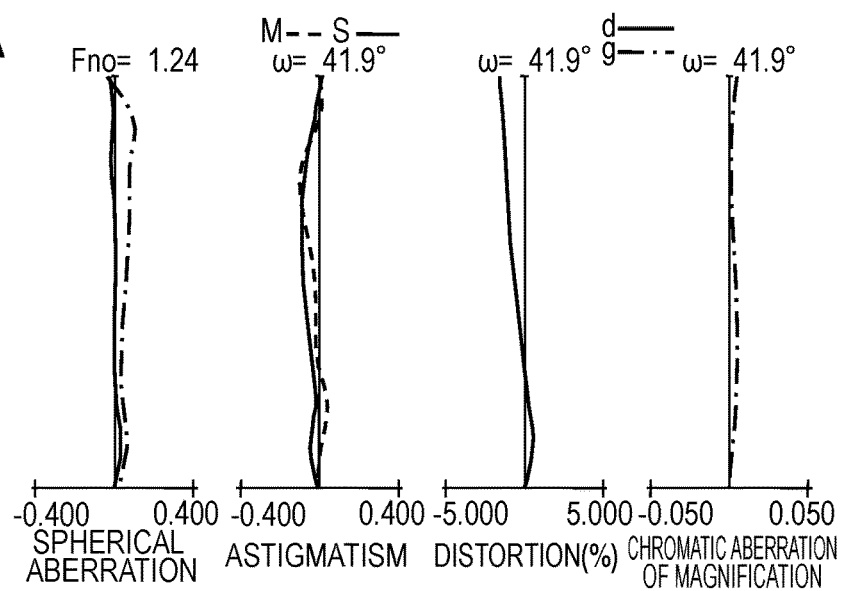
FIG. 10A illustrates longitudinal aberration graphs when focused on an object at an object distance of infinity in Numerical Embodiment 5.
Figure 10B:
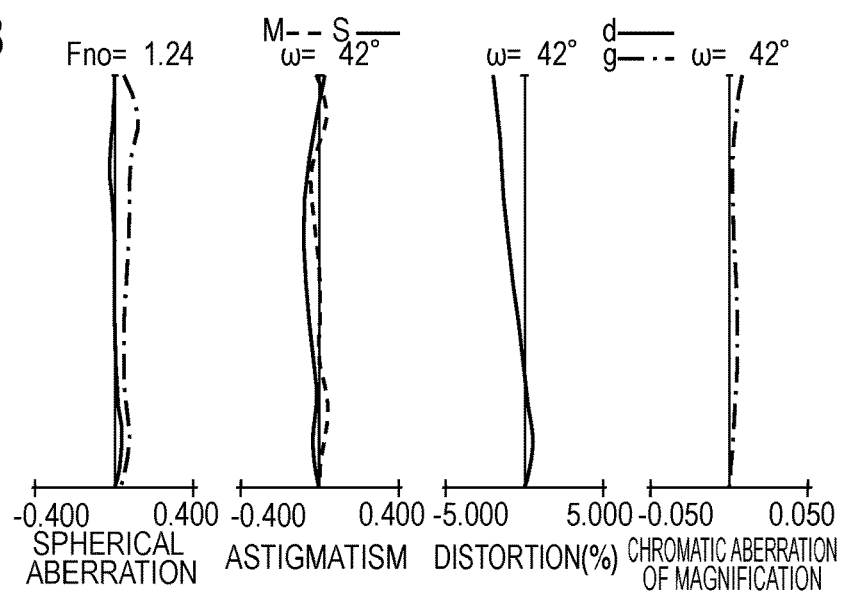
FIG. 10B illustrates longitudinal aberration graphs when focused on an object at an object distance of 1.2 m in Numerical Embodiment 5.
Figure 10C:
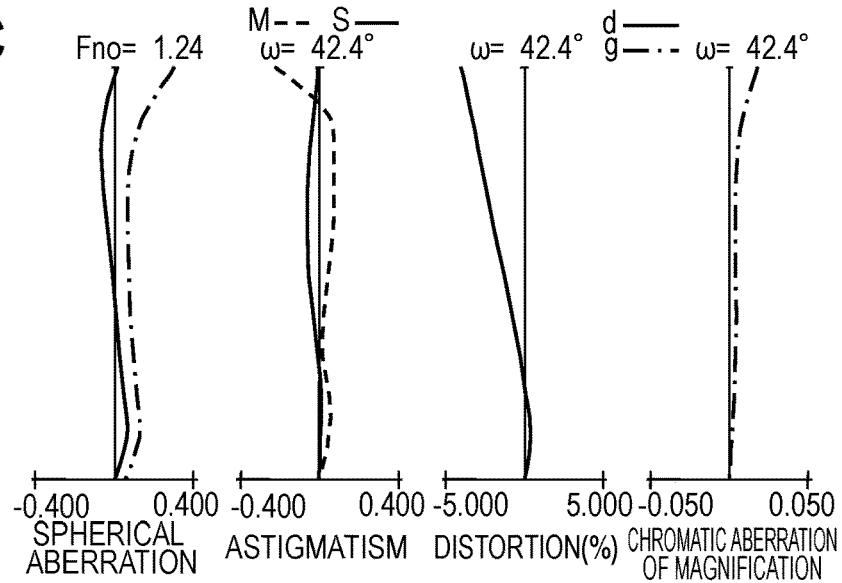
FIG. 10C illustrates longitudinal aberration graphs when focused on an object at an object distance of 0.3 m in Numerical Embodiment 5.

FIG. 9 is a cross-sectional view of lenses when focused at infinity in a fixed focal length lens that is Embodiment 5 (Numerical Embodiment 5) of the present invention. FIGS. 10A, 10B and 10C illustrate longitudinal aberration graphs when focused on an object at infinity, 1.2 m and 0.3 m, respectively.

In FIG. 9, the fixed focal length lens has, in order from an object side to an image side, a first lens unit L1 having a positive refractive power that does not move for focusing, and furthermore, a second lens unit L2 having a negative refractive power that, when shifting focus to a nearby object from infinity, moves to the object side, and a third lens unit L3 having a positive refractive power that, when shifting focus to a nearby object from infinity, moves to the object side by a movement amount that is different from a movement amount of the second lens unit L2.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a biconvex lens, and a biconvex lens. The first surface and the second surface are aspherical surfaces, and mainly perform correction of distortion and astigmatism. The third surface and the fourth surface are aspherical surfaces, and mainly perform correction of astigmatism. In addition, the eighth surface is an aspherical surface, and mainly performs correction of spherical aberration.

The second lens unit L2 corresponds to a tenth surface to a sixteenth surface. The second lens unit L2 includes, in order from the object side to the image side, a cemented lens consisting of a biconvex lens and a biconcave lens, a biconcave lens, and a meniscus convex lens that is concave toward the image side. Further, the tenth surface is an aspherical surface, and mainly performs correction of spherical aberration.

The third lens unit L3 corresponds to a seventeenth surface to a twenty-fifth surface. The third lens unit L3 includes, in order from the object side to the image side, an aperture stop SP, a cemented lens consisting of a meniscus convex lens which is concave toward the object side and a meniscus concave lens which is concave toward the object side, a cemented lens consisting of a meniscus concave lens which is concave toward the image side and a biconvex lens, and a biconvex lens. Further, the twenty-fourth surface is an aspherical surface, and mainly performs correction of spherical aberration and astigmatism.

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 83.84° and an aperture of F1.24. Furthermore, the present embodiment realizes a fixed focal length lens having high optical performance in which aberrations are favorably corrected over the entire focusing range.

Embodiment 6

Figure 11:
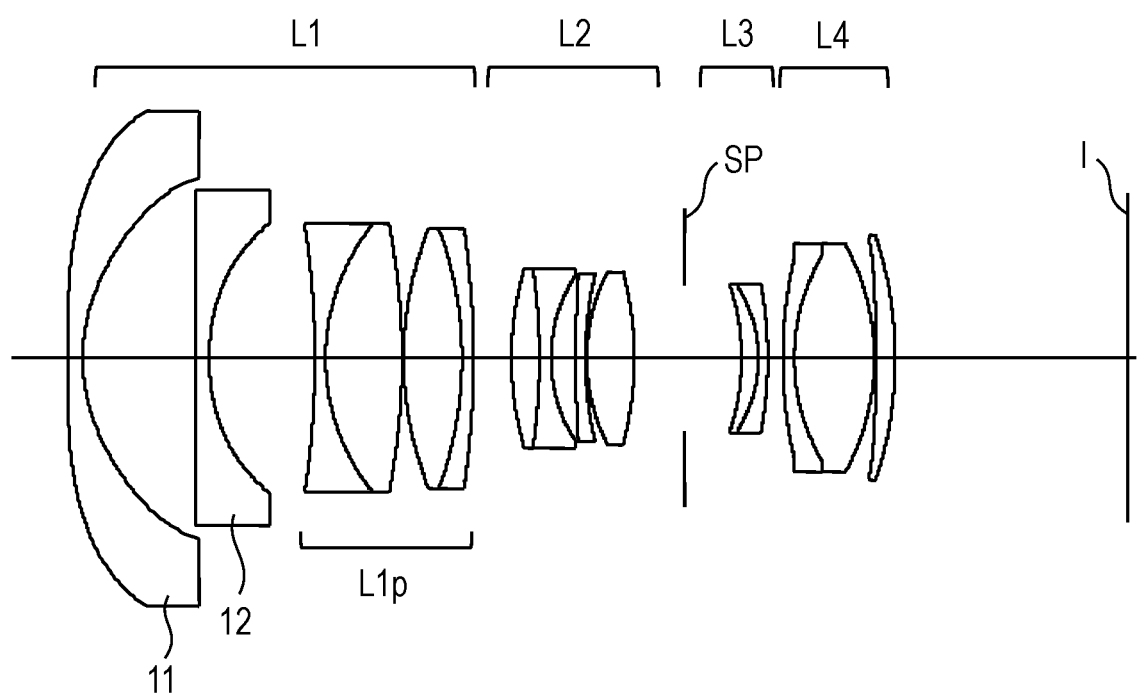
FIG. 11 is a cross-sectional view of lenses when focused at infinity in Numerical Embodiment 6.
Figure 12A:
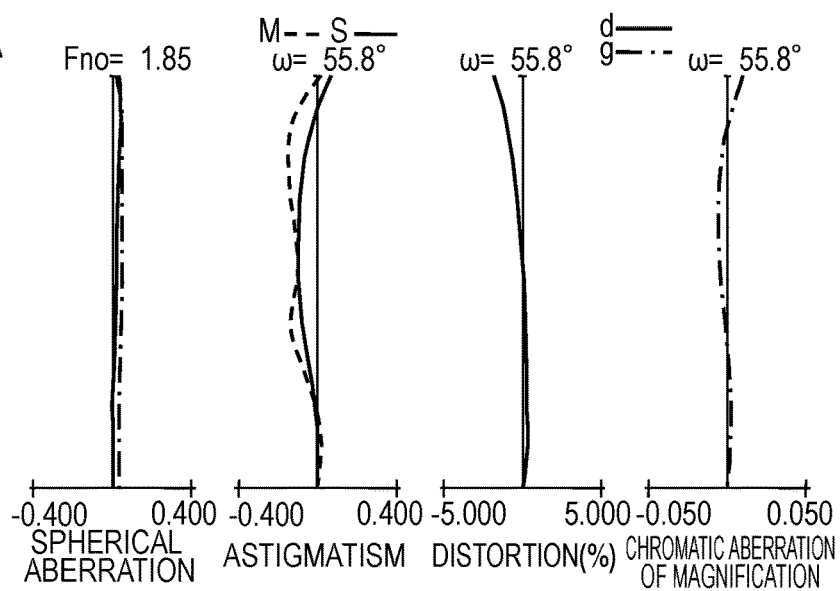
FIG. 12A illustrates longitudinal aberration graphs when focused on an object at an object distance of infinity in Numerical Embodiment 6.
Figure 12B:
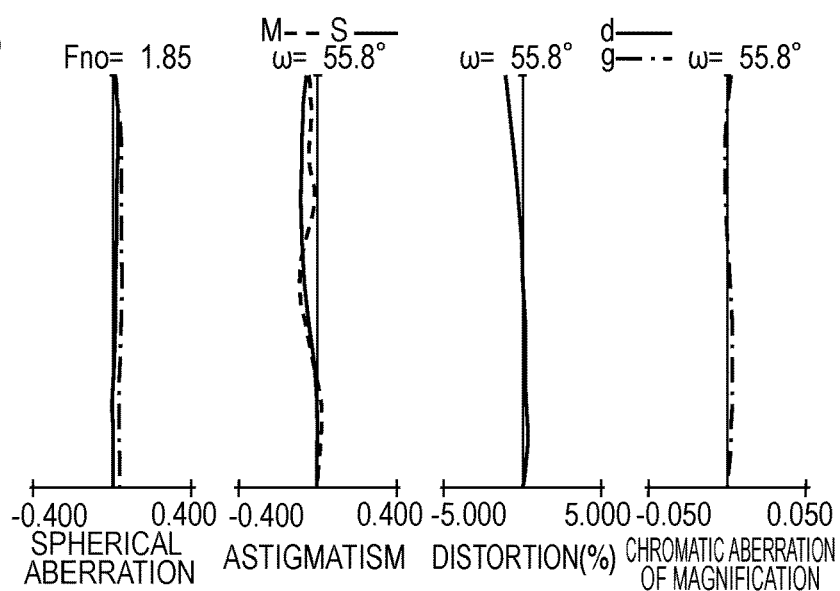
FIG. 12B illustrates longitudinal aberration graphs when focused on an object at an object distance of 0.7 m in Numerical Embodiment 6.
Figure 12C:
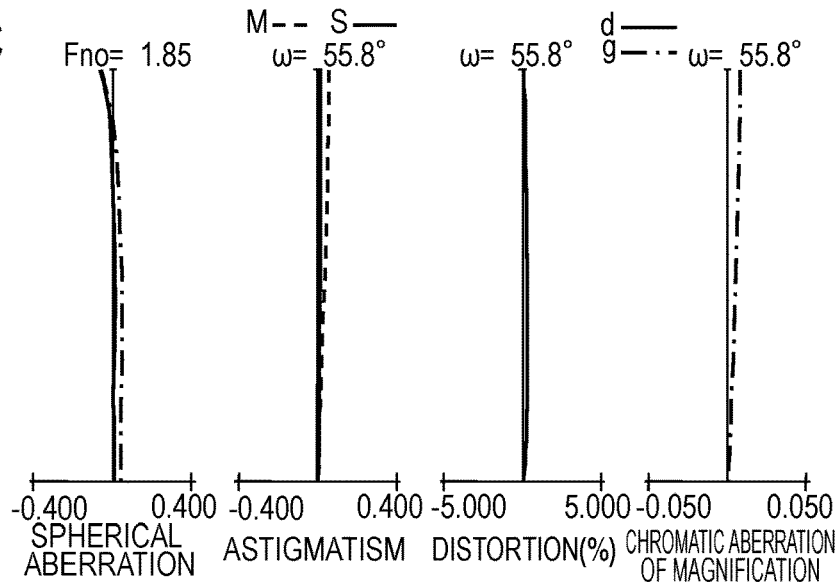
FIG. 12C illustrates longitudinal aberration graphs when focused on an object at an object distance of 0.3 m in Numerical Embodiment 6.

FIG. 11 is a cross-sectional view of lenses when focused at infinity in a fixed focal length lens that is Embodiment 6 (Numerical Embodiment 6) of the present invention. FIGS. 12A, 12B and 12C illustrate longitudinal aberration graphs when focused on an object at infinity, 0.7 m and 0.3 m, respectively.

In FIG. 11, the fixed focal length lens has, in order from an object side to an image side, a first lens unit L1 having a positive refractive power that does not move for focusing, and furthermore, a second lens unit L2 having a positive refractive power that, when shifting focus to a nearby object from infinity, moves to the object side, a third lens unit L3 having a negative refractive power that does not move for focusing, and a fourth lens unit L4 having a positive refractive power that, when shifting focus to a nearby object from infinity, moves to the object side by a movement amount that is different from a movement amount of the second lens unit L2.

Next, the first lens unit L1 of the present embodiment will be described.

The first lens unit L1 corresponds to a first surface to a tenth surface. The first lens unit L1 includes, in order from the object side to the image side, a meniscus concave lens that is convex toward the object side, a meniscus concave lens that is convex toward the object side, a cemented lens consisting of a biconcave lens and a biconvex lens, and a cemented lens consisting of a biconvex lens and a meniscus concave lens which is concave toward the object side. The first surface and the second surface are aspherical surfaces, and mainly perform correction of distortion and astigmatism. The third surface and the fourth surface are aspherical surfaces, and mainly perform correction of astigmatism. In addition, the eighth surface is an aspherical surface, and mainly performs correction of spherical aberration.

The second lens unit L2 corresponds to an eleventh surface to a seventeenth surface. The second lens unit L2 includes, in order from the object side to the image side, a cemented lens consisting of a biconvex lens and a biconcave lens, a biconcave lens, and a biconvex lens.

The third lens unit L3 corresponds to an eighteenth surface to a twenty-first surface. The third lens unit L3 includes, in order from the object side to the image side, an aperture stop SP, and a cemented lens consisting of a meniscus convex lens which is concave toward the object side and a meniscus concave lens which is concave toward the object side.

The fourth lens unit L4 corresponds to a twenty-second surface to a twenty-sixth surface. The fourth lens unit L4 includes, in order from the object side to the image side, a cemented lens consisting of a meniscus concave lens which is concave toward the image side and a biconvex lens, and a biconvex lens. Further, the twenty-fifth surface is an aspherical shape, and mainly performs correction of spherical aberration and astigmatism.

Table 1 lists the corresponding values for the respective conditional expressions of the present embodiment. The present embodiment satisfies expressions (1) to (9), and achieves a reduction in the size of a large aperture wide-angle lens having an image-taking angle of view (angle of view) of 111.64° and an aperture of F1.85. Furthermore, the present embodiment realizes a fixed focal length lens having high optical performance in which aberrations are favorably corrected over the entire focusing range.

Embodiment 7

Figure 13:
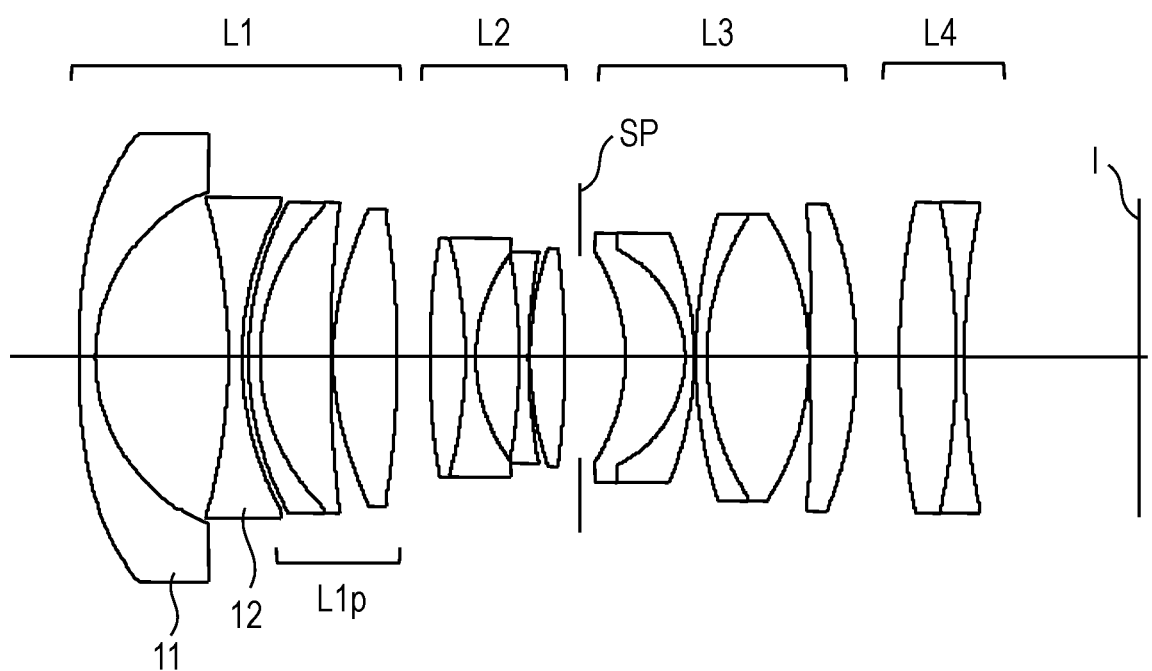
FIG. 13 is a cross-sectional view of lenses when focused at infinity in Numerical Embodiment 7.
Figure 14A:
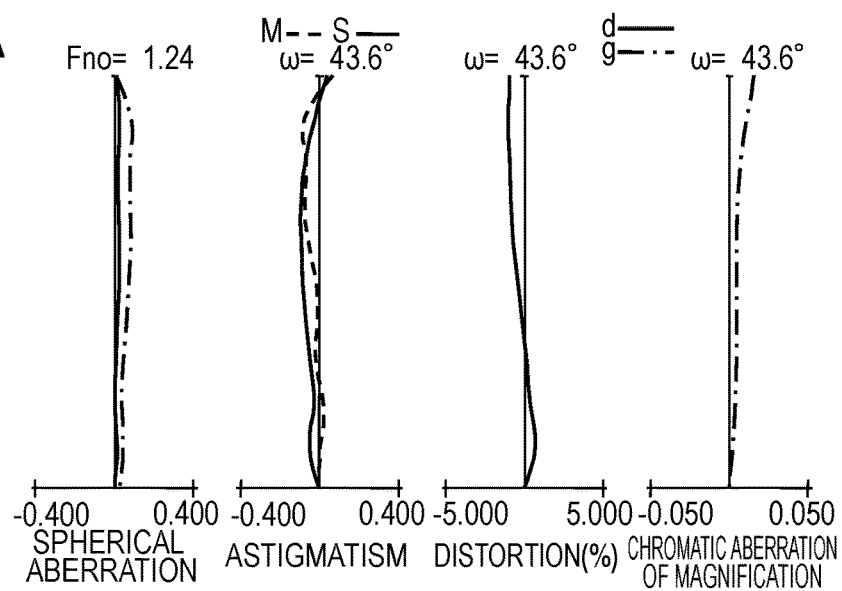
FIG. 14A illustrates longitudinal aberration graphs when focused on an object at an object distance of infinity in Numerical Embodiment 7.
Figure 14B:
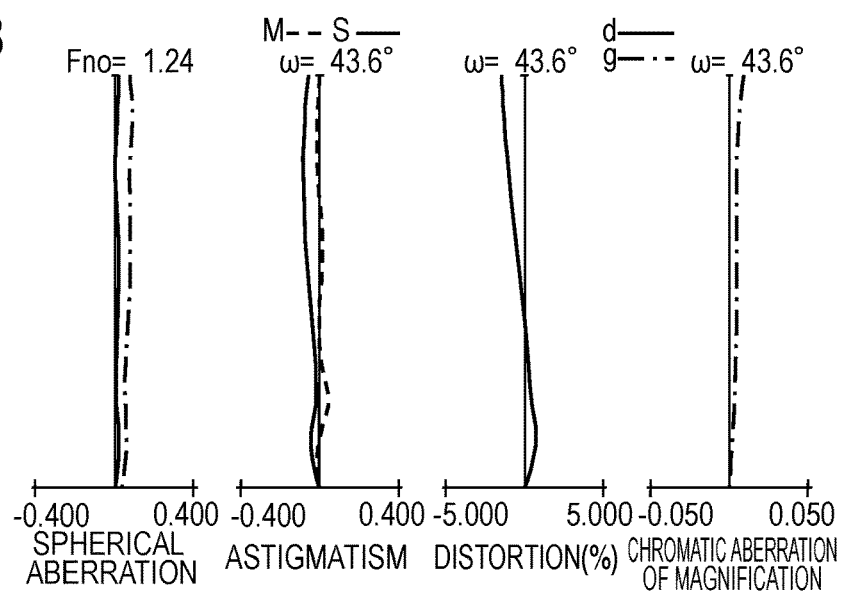
FIG. 14B illustrates longitudinal aberration graphs when focused on an object at an object distance of 1.1 m in Numerical Embodiment 7.
Figure 14C:
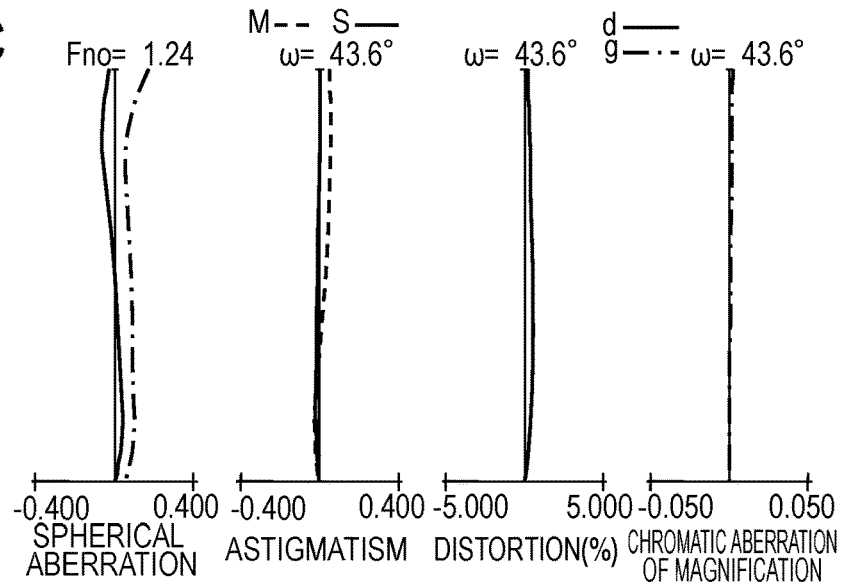
FIG. 14C illustrates longitudinal aberration graphs when focused on an object at an object distance of 0.3 m in Numerical Embodiment 7.

FIG. 13 is a cross-sectional view of lenses when focused at infinity in a fixed focal length lens that is Embodiment 7 (Numerical Embodiment 7) of the present invention. FIGS. 14A, 14B and 14C illustrate longitudinal aberration graphs when focused on an object at infinity, 1.1 m and 0.3 m, respectively.

In FIG. 13, the fixed focal length lens has, in order from an object side to an image side, a first lens unit L1 having a positive refractive power that does not move for focusing, and furthermore, a second lens unit L2 having a negative refractive power that, when shifting focus to a nearby object from infinity, moves to the object side, a third lens unit L3 having a positive refractive power that, when shifting focus to a nearby object from infinity, moves to the object side by a movement amount that is different from a movement amount of the second lens unit L2, and a fourth lens unit L4 having a positive refractive power that does not move for focusing.

Next, the first lens unit L1 of the present embodiment will be described. The first lens unit L1 corresponds to a first surface to a ninth surface. The first lens unit L1 includes, in order from the object side to the image side, a meniscus concave lens that is convex toward the object side, a biconcave lens, a cemented lens consisting of a meniscus concave lens that is convex toward the object side and a biconvex lens, and a biconvex lens. The first surface and the second surface are aspherical surfaces, and mainly perform correction of distortion and astigmatism. The third surface is an aspherical surface, and mainly performs correction of astigmatism. In addition, the eighth surface is an aspherical surface, and mainly performs correction of spherical aberration.

The second lens unit L2 corresponds to a tenth surface to a sixteenth surface. The second lens unit L2 includes, in order from the object side to the image side, a cemented lens consisting of a biconvex lens and a biconcave lens, a biconcave lens, and a biconvex lens. The third lens unit L3 corresponds to a seventeenth surface to a twenty-fifth surface.

The third lens unit L3 includes, in order from the object side to the image side, an aperture stop SP, a cemented lens consisting of a meniscus convex lens which is concave toward the object side and a meniscus concave lens which is concave toward the object side, a cemented lens consisting of a meniscus concave lens which is concave toward the image side and a biconvex lens, and a biconvex lens. Further, the twenty-fourth surface is an aspherical surface, and mainly performs correction of spherical aberration and astigmatism.

The fourth lens unit L4 includes a cemented lens consisting of a biconvex lens and a biconcave lens in order from the object side to the image side.

Table 1 lists the corresponding values for the respective conditional expressions of the present embodiment. The present embodiment satisfies expressions (1) to (10), and achieves a reduction in the size of a large aperture wide-angle lens having an image-taking angle of view (angle of view) of 87.26° and an aperture of F1.24. Furthermore, the present embodiment realizes a fixed focal length lens having high optical performance in which aberrations are favorably corrected over the entire focusing range.

While exemplary embodiments of the present invention have been described above, it is to be understood that the present invention is not limited to these exemplary embodiments, and various modifications and alterations can be made without departing from the gist of the present invention.

Numerical Embodiment 1

| | Unit: mm Surface Data | | | | |
|---|---|---|---|---|---|
| Surface Number | r | d | nd | vd | Effective Diameter |
| 1* | 280.047 | 2.32 | 1.60311 | 60.6 | 62.24 |
| 2 | 24.883 | 17.51 | | | 44.69 |
| 3 | −99.771 | 1.88 | 1.78800 | 47.4 | 43.57 |
| 4 | 47.733 | 1.09 | | | 41.18 |
| 5 | 52.034 | 1.55 | 1.89286 | 20.4 | 41.38 |
| 6 | 25.001 | 10.58 | 1.74000 | 28.3 | 39.55 |
| 7 | 116.448 | 0.23 | | | 39.35 |
| 8* | 38.596 | 9.98 | 1.91650 | 31.6 | 39.72 |
| 9 | −92.636 | (Variable) | | | 38.57 |
| 10 | 58.094 | 5.80 | 1.85026 | 32.3 | 27.66 |
| 11 | −46.620 | 1.49 | 1.60342 | 38.0 | 25.55 |
| 12 | 19.625 | 5.08 | | | 22.63 |
| 13 | −76.613 | 1.30 | 1.65412 | 39.7 | 22.74 |
| 14 | 76.613 | 0.20 | | | 23.42 |
| 15 | 26.450 | 6.53 | 1.49700 | 81.5 | 24.87 |
| 16 | −60.404 | (Variable) | | | 24.87 |
| 17(Stop) | ∞ | 7.32 | | | 24.14 |
| 18 | −19.091 | 3.99 | 1.48749 | 70.2 | 23.44 |
| 19 | −15.527 | 1.65 | 1.84666 | 23.8 | 24.23 |
| 20 | −44.569 | 0.20 | | | 27.88 |
| 21 | 100.123 | 8.30 | 1.61800 | 63.4 | 31.47 |
| 22 | −28.402 | 0.19 | | | 32.88 |
| 23* | −116.747 | 6.01 | 1.85400 | 40.4 | 34.17 |
| 24 | −33.943 | (Variable) | | | 36.22 |
| Image Plane | ∞ | | | | |

Aspherical Surface Data
First Surface

K = 0.00000e+000 A 4 = −2.49717e−005 A 6 = −1.20624e−006 A 8 = −6.71315e−009
A10 = −4.17725e−012 A12 = 2.55967e−015 A14 = −9.63712e−019 A16 = −1.63231e−022
A 3 = 7.67939e−005 A 5 = 8.06146e−006 A 7 = 1.12499e−007 A 9 = 2.43200e−010
A11 = −2.99427e−014 A13 = −1.91367e−017 A15 = 2.34031e−020

Eighth Surface

K = −2.54800e+000 A4 = 6.88677e−006 A6 = 5.14663e−007 A8 = 3.92487e−009
A10 = −9.30826e−012 A12 = 4.26623e−014 A14 = −2.18804e−017 A16 = −4.76121e−020
A 3 = −1.50859e−005 A 5 = −2.56182e−006 A 7 = −6.24564e−008 A 9 = −3.11678e−011
A11 = 8.49317e−014 A13 = −1.87343e−015 A15 = 2.84800e−018

Twenty-third Surface

K = 0.00000e+000 A 4 = −1.19705e−005 A 6 = −2.93407e−009 A 8 = −6.98369e−012
A10 = −1.35994e−014

| Various Data | | | |
|---|---|---|---|
| | Infinity | 50f | Closest |
| Focal Length | 20.50 | 20.45 | 20.26 |
| F-number | 1.45 | 1.45 | 1.45 |
| Half Angle of View | 46.54 | 46.54 | 46.54 |
| Image Height | 21.64 | 21.64 | 21.64 |
| Total Length of Lens | 100.04 | 99.55 | 97.71 |

-continued

|  |  |  |  |
|---|---|---|---|
| BF | 38.32 | 38.81 | 40.65 |
| d 9 | 4.60 | 4.26 | 2.99 |
| d16 | 2.22 | 2.07 | 1.51 |
| d24 | 38.32 | 38.81 | 40.64 |

Lens Unit Data

| Unit | Starting Surface | Focal Length |
|---|---|---|
| 1 | 1 | 118.53 |
| 2 | 10 | 752.47 |
| 3 | 17 | 37.06 |

Single Lens Data

| Lens | Starting Surface | Focal Length |
|---|---|---|
| 1 | 1 | −45.44 |
| 2 | 3 | −40.74 |
| 3 | 5 | −55.40 |
| 4 | 6 | 41.00 |
| 5 | 8 | 30.85 |
| 6 | 10 | 31.21 |
| 7 | 11 | −22.70 |
| 8 | 13 | −58.37 |
| 9 | 15 | 37.96 |
| 10 | 18 | 124.81 |
| 11 | 19 | −28.90 |
| 12 | 21 | 36.71 |
| 13 | 23 | 54.22 |

Numerical Embodiment 2

Unit: mm
Surface Data

| Surface Number | r | d | nd | vd | Effective Diameter |
|---|---|---|---|---|---|
| 1* | 243.506 | 2.32 | 1.61881 | 63.9 | 62.56 |
| 2* | 23.259 | 18.73 |  |  | 43.64 |
| 3 | −71.369 | 1.88 | 1.80400 | 46.6 | 41.61 |
| 4 | 53.250 | 1.83 |  |  | 39.26 |
| 5 | 96.579 | 1.55 | 1.89286 | 20.4 | 39.27 |
| 6 | 31.820 | 9.12 | 1.67270 | 32.1 | 38.55 |
| 7 | −358.338 | 0.38 |  |  | 38.68 |
| 8* | 41.332 | 8.62 | 2.00100 | 29.1 | 38.84 |
| 9 | −101.071 | (Variable) |  |  | 37.87 |
| 10 | 94.263 | 4.99 | 1.95375 | 32.3 | 29.82 |
| 11 | −53.514 | 1.50 | 1.59270 | 35.3 | 29.42 |
| 12 | 21.145 | 5.85 |  |  | 25.98 |
| 13 | −97.330 | 1.30 | 1.81600 | 46.6 | 26.09 |
| 14 | 78.765 | 0.20 |  |  | 26.88 |
| 15 | 30.613 | 8.93 | 1.53775 | 74.7 | 28.98 |
| 16 | −39.236 | (Variable) |  |  | 29.11 |
| 17(Stop) | ∞ | 6.47 |  |  | 27.40 |
| 18 | −26.049 | 7.55 | 1.53775 | 74.7 | 26.33 |
| 19 | −15.799 | 1.28 | 2.00330 | 28.3 | 26.97 |
| 20 | −53.733 | 0.24 |  |  | 31.80 |
| 21 | 87.041 | 11.11 | 1.55032 | 75.5 | 35.79 |
| 22 | −29.957 | 0.19 |  |  | 36.85 |
| 23* | −261.673 | 6.56 | 1.82080 | 42.7 | 36.29 |
| 24 | −36.349 | (Variable) |  |  | 38.05 |
| Image Plane | ∞ |  |  |  |  |

Aspherical Surface Data
First Surface

K = −2.88243e+002 A 4 = −5.60715e−005 A 6 = −1.30023e−006 A 8 = −6.65573e−009
A10 = −4.42776e−012 A12 = 2.49515e−015 A14 = −9.49586e−019 A16 = −1.63526e−022
A 3 = 2.53918e−004 A 5 = 1.05587e−005 A 7 = 1.13235e−007 A 9 = 2.44328e−010
A11 = −2.15463e−014 A13 = −2.05118e−017 A15 = 2.35592e−020

-continued

| Second Surface |
| --- |
| K = 0.00000e+000 A4 = 1.58036e−005 A6 = 3.83224e−007 A8 = 1.79558e−010 A10 = 9.10642e−014 A12 = −1.62442e−016 A14 = 5.01400e−020 A 3 = −5.25304e−007 A 5 = −4.51676e−006 A 7 = −1.42900e−008 |
| Eighth Surface |
| K = −4.65362e+000 A4 = 1.58079e−005 A6 = 5.95434e−007 A8 = 3.96890e−009 A10 = −8.41371e−012 A12 = 4.44778e−014 A14 = −1.80480e−017 A16 = −4.79825e−020 A 3 = −3.58049e−005 A 5 = −3.49377e−006 A 7 = −6.64222e−008 A 9 = −3.41335e−011 A11 = 2.75680e−014 A13 = −1.95609e−015 A15 = 2.79012e−018 |
| Twenty-third Surface |
| K = 0.00000e+000 A 4 = −9.57123e−006 A 6 = −1.56569e−009 A 8 = −2.48776e−012 A10 = −8.81513e−015 |

Various Data

|  | Infinity | 50f | Closest |
| --- | --- | --- | --- |
| Focal Length | 18.52 | 18.46 | 18.25 |
| F-number | 1.31 | 1.31 | 1.31 |
| Half Angle of View | 49.44 | 49.53 | 49.85 |
| Image Height | 21.64 | 21.64 | 21.64 |
| Total Length of Lens | 106.98 | 106.51 | 104.95 |
| BF | 38.97 | 39.44 | 41.00 |
| d9 | 4.60 | 4.26 | 3.14 |
| d16 | 1.77 | 1.64 | 1.19 |
| d24 | 38.97 | 39.44 | 41.00 |

Lens Unit Data

| Unit | Starting Surface | Focal Length |
| --- | --- | --- |
| 1 | 1 | 80.00 |
| 2 | 10 | 254.30 |
| 3 | 17 | 39.06 |

Single Lens Data

| Lens | Starting Surface | Focal Length |
| --- | --- | --- |
| 1 | 1 | −41.72 |
| 2 | 3 | −37.68 |
| 3 | 5 | −53.76 |
| 4 | 6 | 43.86 |
| 5 | 8 | 30.22 |
| 6 | 10 | 36.39 |
| 7 | 11 | −25.38 |
| 8 | 13 | −53.17 |
| 9 | 15 | 33.47 |
| 10 | 18 | 59.36 |
| 11 | 19 | −22.69 |
| 12 | 21 | 41.91 |
| 13 | 23 | 50.76 |

Numerical Embodiment 3

Unit: mm
Surface Data

| Surface Number | r | d | nd | vd | Effective Diameter |
| --- | --- | --- | --- | --- | --- |
| 1* | 2786.654 | 2.00 | 1.69680 | 55.5 | 64.04 |
| 2* | 24.860 | 16.10 |  |  | 45.97 |
| 3* | 536.422 | 1.70 | 1.80139 | 45.5 | 42.25 |
| 4* | 31.890 | 11.16 |  |  | 35.33 |
| 5 | −314.471 | 1.40 | 1.72916 | 54.7 | 34.57 |
| 6 | 28.160 | 9.83 | 1.72047 | 34.7 | 34.17 |
| 7 | −95.904 | 0.20 |  |  | 34.06 |
| 8* | 44.732 | 7.70 | 1.80000 | 29.8 | 32.41 |
| 9 | −47.213 | 1.50 | 1.95906 | 17.5 | 31.35 |
| 10 | −113.618 | (Variable) |  |  | 30.05 |
| 11 | 39.168 | 3.47 | 1.80400 | 46.6 | 21.44 |

-continued

| | | | | | |
|---|---|---|---|---|---|
| 12 | −91.545 | 1.50 | 1.74400 | 44.8 | 21.01 |
| 13 | 19.557 | 3.55 | | | 19.48 |
| 14 | −224.183 | 1.30 | 1.74400 | 44.8 | 19.68 |
| 15 | 74.076 | 0.20 | | | 20.11 |
| 16 | 27.322 | 5.29 | 1.49700 | 81.5 | 21.05 |
| 17 | −39.876 | (Variable) | | | 21.17 |
| 18(Stop) | ∞ | 7.49 | | | 19.92 |
| 19 | −29.862 | 2.68 | 1.49700 | 81.5 | 18.91 |
| 20 | −16.839 | 1.25 | 2.00100 | 29.1 | 19.05 |
| 21 | −62.679 | 0.21 | | | 20.43 |
| 22 | 67.542 | 1.50 | 1.77250 | 49.6 | 22.58 |
| 23 | 27.002 | 10.18 | 1.65160 | 58.5 | 24.85 |
| 24 | −29.165 | 0.19 | | | 27.79 |
| 25* | −440.134 | 3.18 | 1.72903 | 54.0 | 29.66 |
| 26 | −39.980 | (Variable) | | | 30.19 |
| Image Plane | ∞ | | | | |

Aspherical Surface Data
First Surface

K = 0.00000e+000 A 4 = −5.42967e−005 A 6 = −4.32394e−007 A 8 = 4.04309e−009
A10 = 1.05363e−011 A12 = −2.15414e−015 A14 = 3.00996e−018 A16 = 6.81271e−022
A 3 = 4.24030e−004 A 5 = 7.18871e−006 A 7 = −1.15501e−008 A 9 = −3.02296e−010
A11 = −1.24089e−013 A13 = 2.01762e−017 A15 = −8.38311e−020

Second Surface

K = 0.00000e+000 A4 = −2.53562e−005 A 6 = 5.45429e−008 A 8 = 1.01515e−009
A10 = 4.96460e−013 A12 = −1.89107e−015 A14 = −9.20942e−019
A 3 = 2.24609e−004 A 5 = 4.96748e−007 A 7 = −1.08686e−008 A 9 = −4.39941e−011
A11 = 2.98604e−014 A13 = 6.25430e−017

Third Surface

K = 0.00000e+000 A4 = 6.48158e−006 A6 = 1.65938e−008 A8 = 6.44894e−010
A10 = 1.08263e−012 A12 = −1.01513e−015 A14 = −6.78022e−019
A 3 = −1.52541e−004 A 5 = −2.68370e−007 A 7 = −5.16486e−009 A 9 = −3.70923e−011
A11 = −6.58569e−015 A13 = 4.69814e−017

Fourth Surface

K = 0.00000e+000 A4 = 1.30725e−005 A6 = 3.26968e−008 A8 = −2.31311e−010
A10 = −3.59363e−012 A12 = −5.59882e−016
A 3 = −4.10527e−005 A 5 = 8.63037e−008 A 7 = −4.36813e−009 A 9 = 5.88210e−011
A11 = 8.81223e−014

Eighth Surface

K = 0.00000e+000 A4 = 1.10121e−005 A6 = 1.95731e−006 A8 = 3.43408e−008
A10 = 6.77910e−012 A12 = −3.89667e−013 A14 = 6.50737e−016 A16 = 3.82954e−019
A 3 = 8.67237e−006 A 5 = −6.83348e−006 A 7 = −3.32630e−007 A 9 = −1.89676e−009
A11 = 6.55188e−012 A13 = 2.47739e−015 A15 = −2.81595e−017

Twenty-fifth Surface

K = 0.00000ee+000 A4 = −5.99362e−006 A 6 = 8.73008e−008 A 8 = 2.21968e−010
A10 = 6.43787e−014
A 3 = −1.50420e−005 A 5 = −8.04858e−007 A 7 = −5.95327e−009 A 9 = −4.75558e−012

Various Data

| | Infinity | 50f | Closest |
|---|---|---|---|
| Focal Length | 14.69 | 14.68 | 14.64 |
| F-number | 1.85 | 1.85 | 1.85 |
| Half Angle of View | 55.82 | 55.85 | 55.91 |
| Image Height | 21.64 | 21.64 | 21.64 |
| Total Length of Lens | 104.15 | 103.78 | 102.95 |
| BF | 38.33 | 38.70 | 39.53 |
| d10 | 5.45 | 4.78 | 3.28 |
| d17 | 5.12 | 5.42 | 6.09 |
| d26 | 38.33 | 38.70 | 39.53 |

Lens Unit Data

| Unit | Starting Surface | Focal Length |
|---|---|---|
| 1 | 1 | 85.52 |
| 2 | 11 | 295.91 |
| 3 | 18 | 41.03 |

-continued

| Single Lens Data | | |
|---|---|---|
| Lens | Starting Surface | Focal Length |
| 1 | 1 | −36.01 |
| 2 | 3 | −42.37 |
| 3 | 5 | −35.39 |
| 4 | 6 | 31.25 |
| 5 | 8 | 29.82 |
| 6 | 9 | −85.17 |
| 7 | 11 | 34.53 |
| 8 | 12 | −21.54 |
| 9 | 14 | −74.70 |
| 10 | 16 | 33.50 |
| 11 | 19 | 72.72 |
| 12 | 20 | −23.32 |
| 13 | 22 | −59.19 |
| 14 | 23 | 23.18 |
| 15 | 25 | 60.12 |

Numerical Embodiment 4

| Unit: mm Surface Data | | | | | |
|---|---|---|---|---|---|
| Surface Number | r | d | nd | vd | Effective Diameter |
| 1* | 124.342 | 2.32 | 1.55332 | 71.7 | 59.47 |
| 2* | 24.278 | 17.95 | | | 44.15 |
| 3* | −69.307 | 1.88 | 1.88300 | 40.8 | 42.62 |
| 4 | 43.513 | 0.92 | | | 40.49 |
| 5 | 42.613 | 1.55 | 1.89286 | 20.4 | 41.20 |
| 6 | 28.729 | 9.96 | 1.80440 | 39.6 | 40.12 |
| 7 | 256.325 | 0.38 | | | 39.69 |
| 8* | 34.851 | 8.81 | 1.91082 | 35.3 | 38.91 |
| 9 | −130.394 | (Variable) | | | 37.56 |
| 10 | 126.525 | 4.24 | 2.00100 | 29.1 | 31.10 |
| 11 | −64.135 | 1.50 | 1.59551 | 39.2 | 30.74 |
| 12 | 24.541 | 5.89 | | | 27.26 |
| 13 | −79.299 | 1.30 | 1.85478 | 24.8 | 27.27 |
| 14 | 70.950 | 0.20 | | | 27.94 |
| 15 | 49.653 | 4.41 | 2.05090 | 26.9 | 28.60 |
| 16 | −148.211 | (Variable) | | | 28.61 |
| 17(Stop) | ∞ | 6.47 | | | 28.01 |
| 18 | −27.251 | 8.80 | 1.49700 | 81.5 | 27.48 |
| 19 | −16.315 | 1.28 | 1.85478 | 24.8 | 28.53 |
| 20 | −43.846 | 0.24 | | | 33.30 |
| 21 | 64.097 | 1.55 | 1.80400 | 46.6 | 37.61 |
| 22 | 33.528 | 14.69 | 1.61800 | 63.4 | 37.91 |
| 23 | −36.084 | 0.19 | | | 38.69 |
| 24* | 524.948 | 5.49 | 1.77250 | 49.5 | 39.90 |
| 25 | −56.303 | (Variable) | | | 40.73 |
| Image Plane | ∞ | | | | |

Aspherical Surface Data
First Surface

K = −3.11045e+000 A 4 = −4.57350e−005 A 6 = −1.28999e−006 A 8 = −6.66751e−009
A10 = −4.43035e−012 A12 = 2.48154e−015 A14 = −9.44442e−019 A16 = −1.63526e−022
A3 = 1.77742e−004 AS = 9.97978e−006 A7 = 1.13464e−007 A9 = 2.44383e−010
A11 = −2.09722e−014 A13 = −2.06537e−017 A15 = 2.35592e−020

Second Surface

K = 0.00000e+000 A4 = 2.43175e−005 A6 = 3.41811e−007 A8 = −2.25060e−010
A10 = 3.31153e−013 A12 = 5.04323e−016 A14 = −2.43214e−019
A 3 = −5.49362e−005 A 5 = −4.33964e−006 A 7 = −9.71720e−009 A 9 = 1.46521e−011
A11 = −3.28841e−014 A13 = 8.08294e−018

-continued

Third Surface

K = 0.00000e+000 A4 = 8.56486e−006 A6 = 6.83786e−009 A8 = −9.15246e−011
A10 = −7.93842e−014 A12 = 2.28462e−017
A 3 = −1.10897e−005 A 5 = −4.12158e−007 A 7 = 5.75180e−010 A 9 = 4.69861e−012
A11 = −6.27725e−016

Eighth Surface

K = −2.78258e+000 A 4 = 1.12825e−005 A 6 = 6.07769e−007A 8 = 4.09411e−009
A10 = −8.70539e−012 A12 = 4.50759e−014 A14 = −1.87989e−017 A16 = −4.75468e−020
A 3 = −3.59842e−005 A 5 = −3.37085e−006 A 7 = −6.83208e−008 A 9 = −3.41335e−011
A11 = 2.75680e−014 A13 = −1.95609e−015 A15 = 2.79012e−018

Twenty-fourth Surface

K = 0.00000e+000 A4 = −5.77335e−006 A6 = 1.74326e−010 A 8 = −4.34310e−012
A10 = 4.20232e−015

Various Data

|  | Infinity | 50f | Closest |
|---|---|---|---|
| Focal Length | 22.69 | 22.60 | 22.20 |
| F-number | 1.24 | 1.24 | 1.25 |
| Half Angle of View | 43.63 | 43.75 | 44.27 |
| Image Height | 21.64 | 21.64 | 21.64 |
| Total Length of Lens | 107.46 | 106.9 | 104.5 |
| BF | 38.32 | 38.88 | 41.28 |
| d 9 | 4.97 | 4.52 | 2.57 |
| d16 | 2.47 | 2.37 | 1.92 |
| d25 | 38.32 | 38.88 | 41.28 |

Lens Unit Data

| Unit | Starting Surface | Focal Length |
|---|---|---|
| 1 | 1 | 80.00 |
| 2 | 10 | −306.88 |
| 3 | 17 | 35.98 |

Single Lens Data

| Lens | Starting Surface | Focal Length |
|---|---|---|
| 1 | 1 | −54.98 |
| 2 | 3 | −30.04 |
| 3 | 5 | −104.25 |
| 4 | 6 | 39.45 |
| 5 | 8 | 30.98 |
| 6 | 10 | 43.00 |
| 7 | 11 | −29.62 |
| 8 | 13 | −43.63 |
| 9 | 15 | 35.80 |
| 10 | 18 | 64.56 |
| 11 | 19 | −31.06 |
| 12 | 21 | −89.46 |
| 13 | 22 | 30.59 |
| 14 | 24 | 66.10 |

Numerical Embodiment 5

Unit: mm
Surface Data

| Surface Number | r | d | nd | vd | Effective Diameter |
|---|---|---|---|---|---|
| 1* | 93.205 | 2.32 | 1.55332 | 71.7 | 53.00 |
| 2* | 22.183 | 18.23 |  |  | 39.45 |
| 3* | −37.497 | 1.88 | 1.95150 | 29.8 | 38.08 |
| 4* | 56.955 | 0.92 |  |  | 38.06 |
| 5 | 62.398 | 1.55 | 1.89286 | 20.4 | 38.79 |
| 6 | 32.454 | 8.75 | 1.95375 | 32.3 | 38.74 |
| 7 | −524.508 | 0.38 |  |  | 38.63 |
| 8* | 37.072 | 7.08 | 1.95375 | 32.3 | 37.86 |
| 9 | −133.302 | (Variable) |  |  | 37.05 |

-continued

| | | | | | |
|---|---|---|---|---|---|
| 10* | 75.675 | 6.43 | 1.95375 | 32.3 | 36.08 |
| 11 | −71.464 | 1.50 | 1.59551 | 39.2 | 35.45 |
| 12 | 29.215 | 6.16 | | | 30.77 |
| 13 | −274.235 | 1.30 | 1.85026 | 32.3 | 30.47 |
| 14 | 71.802 | 0.20 | | | 30.25 |
| 15 | 49.893 | 3.61 | 1.85478 | 24.8 | 30.49 |
| 16 | 856.464 | (Variable) | | | 30.27 |
| 17(Stop) | ∞ | 6.47 | | | 29.63 |
| 18 | −33.049 | 8.46 | 1.43875 | 94.7 | 28.79 |
| 19 | −17.041 | 1.28 | 1.85478 | 24.8 | 29.20 |
| 20 | −55.662 | 0.24 | | | 33.97 |
| 21 | 54.719 | 1.55 | 1.80400 | 46.6 | 38.74 |
| 22 | 32.270 | 15.44 | 1.59282 | 68.6 | 38.84 |
| 23 | −36.045 | 0.19 | | | 39.55 |
| 24* | 210.486 | 7.30 | 1.75501 | 51.2 | 40.32 |
| 25 | −61.189 | (Variable) | | | 41.58 |
| Image Plane | ∞ | | | | |

Aspherical Surface Data
First Surface

K = 5.30392e−001 A4 = −4.30737e−005 A 6 = −1.26901e−006 A 8 = −6.68400e−009
A10 = −4.42078e−012 A12 = 2.47665e−015 A14 = −9.35389e−019 A16 = −1.63526e−022
A3 = 1.95564e−004 A5 = 9.47370e−006 A7 = 1.13524e−007 A9 = 2.44280e−010
A11 = −2.07295e−014 A13 = −2.10207e−017 A15 = 2.35592e−020

Second Surface

K = 0.00000e+000 A4 = 2.63781e−005 A6 = 3.50673e−007A 8 = −2.68657e−010
A10 = 4.40699e−013 A12 = 5.51496e−016 A14 = −5.49971e−019
A 3 = −1.31649e−005 A 5 = −4.38964e−006 A 7 = −9.97076e−009 A 9 = 1.82078e−011
A11 = −4.39583e−014 A13 = 1.86930e−017

Third Surface

K = 0.00000e+000 A4 = 2.36896e−005 A6 = 4.37290e−009A 8 = −5.77029e−011
A10 = −1.47324e−013 A12 = 7.37856e−017
A 3 = −5.26467e−005 A 5 = −8.37908e−007 A 7 = 3.11969e−010 A 9 = 5.50954e−012
A11 = −1.23249e−015

Fourth Surface

K = 0.00000e+000 A 4 = 6.67520e−007 A 6 = −1.93569e−009A 8 = 6.81567e−012
A10 = 3.38709e−014 A12 = 8.90048e−017
A 3 = −6.48133e−005 A 5 = −5.32308e−008 A 7 = 7.19357e−012 A 9 = 2.12798e−013
A11 = −3.80549e−015

Eighth Surface

K = −3.02579e+000 A 4 = 2.90929e−006 A 6 = 6.06971e−007A 8 = 4.14687e−009
A10 = −8.83946e−012 A12 = 4.53489e−014 A14 = −1.90790e−017 A16 = −4.74526e−020
A 3 = −4.72561e−005 A 5 = −3.13706e−006 A 7 = −6.89257e−008 A 9 = −3.41335e−011
A11 = 2.75680e−014 A13 = −1.95609e−015 A15 = 2.79012e−018

Tenth Surface

K = −1.46185e+000 A 4 = 2.83129e−006 A 6 = 2.62008e−008A 8 = 4.25153e−011
A10 = −2.29279e−014
A 3 = 3.85700e−007 A 5 = −1.81083e−007 A 7 = −1.50887e−009

Twenty-fourth Surface

K = 0.00000e+000 A 4 = −6.05524e−006 A 6 = −3.01137e−010 A 8 = −4.42710e−012
A10 = 2.53089e−015

Various Data

| | Infinity | 50f | Closest |
|---|---|---|---|
| Focal Length | 24.10 | 24.03 | 23.69 |
| F-number | 1.24 | 1.24 | 1.24 |
| Half Angle of View | 41.92 | 42.00 | 42.40 |
| Image Height | 21.64 | 21.64 | 21.64 |
| Total Length of Lens | 108.28 | 107.72 | 104.96 |
| BF | 38.33 | 38.89 | 41.65 |
| d 9 | 4.32 | 4.03 | 2.60 |
| d16 | 2.73 | 2.46 | 1.13 |
| d25 | 38.33 | 38.89 | 41.65 |

-continued

| Lens Unit Data | | |
|---|---|---|
| Unit | Starting Surface | Focal Length |
| 1 | 1 | 115.00 |
| 2 | 10 | −1686.31 |
| 3 | 17 | 38.18 |

| Single Lens Data | | |
|---|---|---|
| Lens | Starting Surface | Focal Length |
| 1 | 1 | −53.23 |
| 2 | 3 | −23.53 |
| 3 | 5 | −77.64 |
| 4 | 6 | 32.29 |
| 5 | 8 | 31.04 |
| 6 | 10 | 39.38 |
| 7 | 11 | −34.63 |
| 8 | 13 | −66.81 |
| 9 | 15 | 61.85 |
| 10 | 18 | 69.05 |
| 11 | 19 | −29.18 |
| 12 | 21 | −100.94 |
| 13 | 22 | 31.36 |
| 14 | 24 | 63.52 |

Numerical Embodiment 6

| Unit: mm Surface Data | | | | | |
|---|---|---|---|---|---|
| Surface Number | r | d | nd | vd | Effective Diameter |
| 1* | 4773.139 | 2.00 | 1.58995 | 61.8 | 63.85 |
| 2* | 24.183 | 14.91 | | | 46.15 |
| 3* | 764.945 | 1.70 | 1.80608 | 46.6 | 42.89 |
| 4* | 28.906 | 13.90 | | | 34.34 |
| 5 | −118.756 | 1.40 | 1.72770 | 50.6 | 33.58 |
| 6 | 28.108 | 10.06 | 1.73086 | 33.9 | 33.90 |
| 7 | −93.805 | 0.20 | | | 34.01 |
| 8* | 45.071 | 7.70 | 1.83295 | 30.3 | 33.00 |
| 9 | −49.660 | 1.50 | 1.95808 | 17.5 | 32.12 |
| 10 | −119.697 | (Variable) | | | 30.96 |
| 11 | 41.900 | 3.71 | 1.78903 | 48.3 | 22.52 |
| 12 | −78.680 | 1.50 | 1.72771 | 37.4 | 22.09 |
| 13 | 20.109 | 3.20 | | | 20.42 |
| 14 | 170.227 | 1.30 | 1.57230 | 50.4 | 20.62 |
| 15 | 47.547 | 0.20 | | | 20.91 |
| 16 | 25.029 | 6.28 | 1.49571 | 80.2 | 21.64 |
| 17 | −43.618 | (Variable) | | | 21.60 |
| 18(Stop) | ∞ | 7.39 | | | 19.29 |
| 19 | −30.912 | 2.24 | 1.49654 | 81.7 | 17.54 |
| 20 | −17.564 | 1.25 | 1.85109 | 28.5 | 17.55 |
| 21 | −50.534 | (Variable) | | | 18.31 |
| 22 | 59.044 | 1.50 | 1.80504 | 46.6 | 24.33 |
| 23 | 26.918 | 10.54 | 1.57497 | 60.6 | 25.93 |
| 24 | −31.315 | 0.19 | | | 28.72 |
| 25* | −381.991 | 2.53 | 1.72949 | 54.7 | 30.44 |
| 26 | −51.667 | (Variable) | | | 30.90 |
| Image Plane | ∞ | | | | |

Aspherical Surface Data
First Surface

K = 0.00000e+000 4 = −4.02808e−005 A 6 = −3.51359e−007 A 8 = 4.14640e−009
A10 = 1.05222e−011 A12 = −2.45780e−015 A14 = 3.02653e−018 A16 = 6.94466e−022
A 3 = 3.22935e−004 A 5 = 5.87562e−006 A 7 = −1.48437e−008 A 9 = −3.05067e−010
A11 = −1.17200e−013 A13 = 2.50657e−017 A15 = −8.52945e−020

-continued

Second Surface

K = 0.00000e+000 A 4 = −2.55430e−005 A 6 = −1.04023e−007 A 8 = −4.92367e−010
A10 = −1.08874e−013 A12 = −8.01269e−016 A14 = −1.28360e−018
A3 = 1.81806e−004 A5 = 8.80758e−007 A7 = 1.00690e−008 A9 = 1.27473e−011
A11 = −3.92081e−015 A13 = 6.59677e−017

Third Surface

K = 0.00000e+000 A 4 = −2.13912e−005 A 6 = −6.25586e−008 A 8 = 6.58023e−010
A10 = 5.04686e−013 A12 = 7.97829e−016 A14 = −2.07852e−019
A 3 = 1.86766e−005 A 5 = 2.28899e−006 A 7 = −7.23435e−009 A 9 = −2.01214e−011
A11 = −2.79813e−014 A13 = −6.45372e−021

Fourth Surface

K = 0.00000e+000 A 4 = −1.26003e−005 A 6 = −1.34082e−007 A 8 = 2.22633e−010
A10 = 1.12319e−012 A12 = 1.54855e−015
A 3 = 1.04398e−004 A 5 = 3.42376e−006 A 7 = −2.01769e−009 A 9 = −7.77298e−012
A11 = −7.37397e−014

Eighth Surface

K = 0.00000e+000 A4 = 9.54655e−006 A6 = 1.77882e−006 A8 = 3.27449e−008
A10 = 8.58267e−012 A12 = −3.81161e−013 A14 = 6.58599e−016 A16 = 3.70911e−019
A 3 = −2.11618e−006 A 5 = −6.02913e−006 A 7 = −3.10047e−007 A 9 = −1.85316e−009
A11 = 6.36227e−012 A13 = 2.10692e−015 A15 = −2.78677e−017

Twenty-fifth Surface

K = 0.00000e+000 A 4 = −7.41920e−006 A 6 = 4.84885e−008 A 8 = 2.68963e−011
A10 = 2.10820e−014
A 3 = 1.27128e−006 A 5 = −4.56670e−007 A 7 = −2.30720e−009 A 9 = 6.49792e−013

Various Data

|  | Infinity | 50f | Closest |
|---|---|---|---|
| Focal Length | 14.69 | 14.69 | 14.69 |
| F-number | 1.85 | 1.85 | 1.85 |
| Half Angle of View | 55.82 | 55.82 | 55.82 |
| Image Height | 21.64 | 21.64 | 21.64 |
| Total Length of Lens | 139.44 | 139.44 | 139.44 |
| BF | 30.62 | 30.80 | 31.57 |
| d10 | 4.99 | 4.72 | 3.56 |
| d17 | 6.67 | 6.94 | 8.10 |
| d21 | 1.95 | 1.77 | 1.00 |
| d26 | 30.62 | 30.80 | 31.57 |

Lens Unit Data

| Unit | Starting Surface | Focal Length |
|---|---|---|
| 1 | 1 | 81.23 |
| 2 | 11 | 122.09 |
| 3 | 18 | −52.44 |
| 4 | 22 | 29.53 |

Single Lens Data

| Lens | Starting Surface | Focal Length |
|---|---|---|
| 1 | 1 | −41.21 |
| 2 | 3 | −37.31 |
| 3 | 5 | −31.11 |
| 4 | 6 | 30.66 |
| 5 | 8 | 29.45 |
| 6 | 9 | −89.52 |
| 7 | 11 | 35.13 |
| 8 | 12 | −21.87 |
| 9 | 14 | −115.73 |
| 10 | 16 | 33.08 |
| 11 | 19 | 77.59 |
| 12 | 20 | −32.19 |
| 13 | 22 | −62.76 |
| 14 | 23 | 26.96 |
| 15 | 25 | 81.64 |

Numerical Embodiment 7

Unit: mm
Surface Data

| Surface Number | r | d | nd | vd | Effective Diameter |
|---|---|---|---|---|---|
| 1* | 114.030 | 2.32 | 1.53381 | 74.3 | 59.90 |
| 2* | 23.813 | 18.63 | | | 44.08 |
| 3* | −67.572 | 1.88 | 1.88339 | 40.0 | 42.46 |
| 4 | 42.773 | 0.92 | | | 40.37 |
| 5 | 43.345 | 1.55 | 1.89284 | 20.4 | 40.99 |
| 6 | 27.939 | 9.83 | 1.83077 | 40.8 | 39.95 |
| 7 | 170.146 | 0.38 | | | 39.54 |
| 8* | 35.116 | 8.98 | 1.94093 | 34.1 | 39.16 |
| 9 | −119.535 | (Variable) | | | 37.92 |
| 10 | 96.607 | 4.94 | 2.00114 | 29.1 | 31.26 |
| 11 | −60.244 | 1.50 | 1.61248 | 37.0 | 30.77 |
| 12 | 22.913 | 6.04 | | | 26.78 |
| 13 | −78.563 | 1.30 | 1.89425 | 24.7 | 26.79 |
| 14 | 72.222 | 0.20 | | | 27.42 |
| 15 | 44.580 | 4.86 | 1.94242 | 25.1 | 28.29 |
| 16 | −117.086 | (Variable) | | | 28.30 |
| 17(Stop) | ∞ | 6.47 | | | 27.68 |
| 18 | −26.197 | 8.31 | 1.50020 | 81.0 | 27.10 |
| 19 | −16.151 | 1.28 | 1.84677 | 24.1 | 28.09 |
| 20 | −43.611 | 0.24 | | | 32.65 |
| 21 | 62.473 | 1.55 | 1.83254 | 45.2 | 36.67 |
| 22 | 34.510 | 14.27 | 1.61012 | 65.5 | 36.86 |
| 23 | −35.620 | 0.19 | | | 37.69 |
| 24* | 502.963 | 6.36 | 1.80430 | 46.4 | 39.37 |
| 25 | −56.170 | (Variable) | | | 40.53 |
| 26 | 98.200 | 8.00 | 1.51633 | 64.1 | 41.25 |
| 27 | −99.500 | 1.10 | 1.60311 | 60.6 | 40.86 |
| 28 | 99.400 | (Variable) | | | 40.45 |
| Image Plane | ∞ | | | | |

Aspherical Surface Data
First Surface

K = −4.23268e+001 A 4 = −4.70660e−005 A 6 = −1.29445e−006 A 8 = −6.66428e−009
A10 = −4.43273e−012 A12 = 2.48190e−015 A14 = −9.44835e−019 A16 = −1.63526e−022
A 3 = 2.02148e−004 A 5 = 1.00919e−005 A 7 = 1.13486e−007 A 9 = 2.44344e−010
A11 = −2.09298e−014 A13 = −2.06396e−017 A15 = 2.35592e−020

Second Surface

K = 0.00000e+000 A4 = 2.17453e−005 A6 = 3.17399e−007 A 8 = −2.58677e−010
A10 = 3.97895e−013 A12 = 6.06689e−016 A14 = −1.79564e−019
A 3 = −3.57392e−005 A 5 = −4.05747e−006 A 7 = −8.33453e−009 A 9 = 1.39295e−011
A11 = −3.51768e−014 A13 = 3.76068e−018

Third Surface

K = 0.00000e+000 A4 = 8.41851e−006 A6 = 5.31895e−009 A 8 = −8.46878e−011
A10 = −1.02181e−013 A12 = 1.22361e−017
A 3 = −6.87487e−006 A 5 = −3.84259e−007 A 7 = 4.94636e−010 A 9 = 4.76386e−012
A11 = 2.50101e−016

Eighth Surface

K = −2.95932e+000 A 4 = 1.16752e−005 A 6 = 6.15102e−007 A 8 = 4.10795e−009
A10 = −8.71565e−012 A12 = 4.50958e−014 A14 = −1.88336e−017 A16 = −4.75207e−020
A 3 = −3.76721e−005 A 5 = −3.43431e−006 A 7 = −6.87906e−008 A 9 = −3.41335e−011
A11 = 2.75680e−014 A13 = −1.95609e−015 A15 = 2.79012e−018

Twenty-fourth Surface

K = 0.00000e+000 A4 = −5.69280e−006 A 6 = −1.24842e−010 A 8 = −3.53051e−012
A10 = 2.75990e−015

Various Data

| | Infinity | 50f | Closest |
|---|---|---|---|
| Focal Length | 22.70 | 22.70 | 22.70 |
| F-number | 1.24 | 1.24 | 1.24 |
| Half Angle of View | 43.63 | 43.63 | 43.63 |
| Image Height | 21.64 | 21.64 | 21.64 |
| Total Length of Lens | 148.02 | 148.02 | 148.02 |
| BF | 24.44 | 24.44 | 24.44 |
| d9 | 4.52 | 4.10 | 2.42 |
| d16 | 1.97 | 1.80 | 1.12 |

-continued

| | | | |
|---|---|---|---|
| d25 | 6.00 | 6.58 | 8.95 |
| d28 | 24.44 | 24.44 | 24.44 |

Lens Unit Data

| Unit | Starting Surface | Focal Length |
|---|---|---|
| 1 | 1 | 80.00 |
| 2 | 10 | −353.61 |
| 3 | 17 | 35.57 |
| 4 | 26 | −679.86 |

Single Lens Data

| Lens | Starting Surface | Focal Length |
|---|---|---|
| 1 | 1 | −56.89 |
| 2 | 3 | −29.42 |
| 3 | 5 | −92.43 |
| 4 | 6 | 39.01 |
| 5 | 8 | 29.68 |
| 6 | 10 | 37.66 |
| 7 | 11 | −26.92 |
| 8 | 13 | −41.91 |
| 9 | 15 | 34.77 |
| 10 | 18 | 66.00 |
| 11 | 19 | −30.95 |
| 12 | 21 | −95.00 |
| 13 | 22 | 31.13 |
| 14 | 24 | 63.14 |
| 15 | 26 | 97.06 |
| 16 | 27 | −82.28 |

Table 1: Corresponding values for each conditional expression in Numerical Embodiments 1 to 7

TABLE 1

| | | Embodiment | | | | | | |
|---|---|---|---|---|---|---|---|---|
| | Conditional Expression | 1 | 2 | 3 | 4 | 5 | 6 | 7 |
| (1) | f1/f | 5.28 | 4.32 | 6.13 | 3.54 | 4.77 | 5.53 | 3.52 |
| (2) | |f1n|/f1 | 0.17 | 0.20 | 0.18 | 0.20 | 0.11 | 0.20 | 0.20 |
| (3) | |f11|/f1 | 0.42 | 0.52 | 0.40 | 0.71 | 0.45 | 0.51 | 0.71 |
| (4) | |f12|/f1 | 0.38 | 0.47 | 0.49 | 0.37 | 0.20 | 0.46 | 0.37 |
| (5) | (R11i + R12o)/(R11i − R12o) | −0.57 | −0.51 | −1.07 | −0.48 | −0.28 | −1.07 | −0.48 |
| (6) | v11 | 60.64 | 63.85 | 54.32 | 74.73 | 70.34 | 61.80 | 74.30 |
| (7) | N12 | 1.79 | 1.80 | 1.81 | 1.88 | 2.00 | 1.81 | 1.88 |
| (8) | f1p/|f1n| | 1.61 | 1.72 | 1.62 | 1.45 | 1.60 | 1.65 | 1.45 |
| (9) | N1pave | 1.83 | 1.67 | 1.76 | 1.88 | 1.97 | 1.78 | 1.88 |
| (10) | |m2|/|m3| | 0.70 | 0.71 | 1.81 | 0.81 | 0.52 | — | 0.71 |
| f1 | | 108.21 | 80.00 | 90.01 | 80.00 | 115.00 | 81.23 | 80.00 |
| f | | 20.50 | 18.52 | 14.69 | 22.60 | 24.10 | 14.69 | 22.70 |
| f1n | | −17.89 | −15.95 | −16.39 | −16.00 | −13.20 | −16.29 | −15.92 |
| f11 | | −45.47 | −41.72 | −35.88 | −56.40 | −52.28 | −41.21 | −56.89 |
| f12 | | −41.52 | −37.68 | −44.21 | −29.82 | −23.42 | −37.31 | −29.41 |
| R11i | | 24.71 | 23.26 | 25.32 | 23.79 | 23.06 | 24.18 | 23.81 |
| R12o | | −89.24 | −71.37 | 784.51 | −67.34 | −41.32 | 764.94 | −67.57 |
| f1p | | 28.80 | 27.48 | 26.59 | 23.26 | 21.14 | 26.86 | 23.15 |
| N1pave | | 1.83 | 1.67 | 1.76 | 1.88 | 1.97 | 1.78 | 1.88 |
| m2 | | 1.63 | 1.45 | 2.17 | 2.41 | 1.72 | 1.42 | 2.10 |
| m3 | | 2.32 | 2.04 | 1.20 | 2.96 | 3.32 | 0 | 2.95 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-189812, filed Sep. 29, 2017, which is hereby incorporated by reference herein in its entirety.

What is claimed is:

1. A fixed focal length lens comprising, in order from an object side to an image side, a first lens unit having a positive refractive power, a second lens unit, and a third lens unit, wherein the first lens unit does not move for focusing, at least the second lens unit moves for focusing, a distance between each pair of adjacent lens units changes for focusing, and the first lens unit includes two negative lenses disposed in succession from the object side, and wherein conditional expressions $1.0 < f1/f < 6.5$, and $0.05 < |f1n|/f1 < 0.22$ are satisfied where f represents a focal length of the fixed focal length lens, f1 represents a focal length of the first lens unit, and f1n represents a combined focal length of the two negative lenses of the first lens unit.

2. The fixed focal length lens according to claim 1, wherein a conditional expression $0.3 < |f11|/f1 < 1.0$ is satisfied where f11 represents a focal length of a first lens, disposed on the object side, of the two negative lenses.

3. The fixed focal length lens according to claim 1, wherein a conditional expression $0.1 < |f12|/f1 < 0.7$ is satisfied where f12 represents a focal length of a second lens, disposed on the image side, of the two negative lenses.

4. The fixed focal length lens according to claim 1, wherein a conditional expression $-1.5 < (R11i+R12o)/(R11i-R12o) < 0$ is satisfied where R11i represents a radius of curvature of a surface on the image side of a first lens, disposed on the object side, of the two negative lenses, and R12o represents a radius of curvature of a surface on the object side of a second lens, disposed on the image side, of the two negative lenses.

5. The fixed focal length lens according to claim 1, wherein a conditional expression $50 < v11 < 80$ is satisfied where v11 represents an Abbe number of a first lens, disposed on the object side, of the two negative lenses.

6. The fixed focal length lens according to claim 1, wherein a conditional expression $1.70 < N12 < 2.10$ is satisfied where N12 represents a refractive index of a second lens, disposed on the image side, of the two negative lenses.

7. The fixed focal length lens according to claim 1, wherein
the first lens unit includes a sub lens unit disposed on the image side of the two negative lenses, and
a conditional expression $1.0 < f1p/|f1n| < 3.0$ is satisfied where f1p represents a focal length of the sub lens unit.

8. The fixed focal length lens according to claim 1, wherein
the first lens unit includes a sub lens unit disposed on the image side of the two negative lenses,
the sub lens unit includes at least one positive lens, and
a conditional expression $1.6 < N1pave < 2.0$ is satisfied where N1pave represents an average refractive index of positive lenses included in the sub lens unit.

9. The fixed focal length lens according to claim 1, wherein
the third lens unit is configured to move differently from the second lens unit for focusing, and
a conditional expression $0.4 < |m2|/|m3| < 2.0$ is satisfied where m2 and m3 respectively represent a movement amount of the second lens unit and a movement amount of the third lens unit required for shift from a case of focusing on an object at infinity to a case of focusing on a closest object.

10. An image pickup apparatus comprising:
a fixed focal length lens comprising, in order from an object side to an image side, a first lens unit having a positive refractive power, a second lens unit, and a third lens unit, wherein the first lens unit does not move for focusing, at least the second lens unit moves for focusing, a distance between each pair of adjacent lens units changes for focusing, and the first lens unit includes two negative lenses disposed in succession from the object side, and wherein
conditional expressions $1.0 < f1/f < 6.5$, and $0.05 < |f1n|/f1 < 0.22$ are satisfied where f represents a focal length of the fixed focal length lens, f1 represents a focal length of the first lens unit, and f1n represents a combined focal length of the two negative lenses of the first lens unit, and
an image pickup element arranged on an image plane of the fixed focal length lens.

* * * * *